United States Patent
Hickie et al.

(10) Patent No.: US 10,161,129 B2
(45) Date of Patent: Dec. 25, 2018

(54) DRAINABLE WEATHER RESISTIVE BARRIER

(71) Applicant: AVINTIV Specialty Materials Inc., Charlotte, NC (US)

(72) Inventors: Brian Andrew Hickie, Hendersonville, TN (US); Gregory Wagner Farell, Hendersonville, TN (US)

(73) Assignee: AVINTIV SPECIALTY MATERIALS, INC., Charlotte, NC (US)

( * ) Notice: Subject to any disclaimer, the term of this patent is extended or adjusted under 35 U.S.C. 154(b) by 24 days.

(21) Appl. No.: 15/398,905

(22) Filed: Jan. 5, 2017

(65) Prior Publication Data

US 2017/0198470 A1    Jul. 13, 2017

Related U.S. Application Data

(60) Provisional application No. 62/276,395, filed on Jan. 8, 2016.

(51) Int. Cl.
*B32B 7/02* (2006.01)
*B32B 27/02* (2006.01)
(Continued)

(52) U.S. Cl.
CPC ............ *E04B 1/625* (2013.01); *B32B 3/10* (2013.01); *B32B 5/02* (2013.01); *B32B 5/022* (2013.01); *B32B 5/024* (2013.01); *B32B 7/045* (2013.01); *B32B 7/08* (2013.01); *B32B 7/12* (2013.01); *B32B 13/12* (2013.01); *B32B 13/14* (2013.01); *B32B 15/08* (2013.01); *B32B 21/02* (2013.01); *B32B 21/08* (2013.01); *B32B 21/10* (2013.01); *B32B 25/08* (2013.01); *B32B 27/08* (2013.01); *B32B 27/12* (2013.01); *B32B 27/20* (2013.01); *B32B 27/302* (2013.01);
(Continued)

(58) Field of Classification Search
CPC . E04B 1/625; E04B 1/70; E04D 13/16; B32B 37/15; B32B 37/153; B32B 37/24
See application file for complete search history.

(56) References Cited

U.S. PATENT DOCUMENTS 3,691,004 A * 9/1972 Werner et al. ............ D04H 3/16
                                                        156/167
3,849,241 A * 11/1974 Butin .................... D01D 5/0985
                                                        156/167
(Continued)

FOREIGN PATENT DOCUMENTS

GB              933649 A *  8/1963  ............... E04D 5/12
WO    WO 2012149637 A1 * 11/2012  ............. E04B 1/665

OTHER PUBLICATIONS

Office Action of corresponding Canadian Patent Application No. 2,953,904 dated Mar. 1, 2018, all enclosed pages cited.

*Primary Examiner* — Christine T Cajilig
(74) *Attorney, Agent, or Firm* — McNair Law Firm, P.A.

(57) ABSTRACT

Drainage promoting fabrics having commercial applications (e.g., housewrap) are provided. The drainage promoting fabric, according to certain embodiments of the invention, includes a weather resistive barrier having an outer surface, and a three-dimensional, non-uniform or non-continuous meltblown layer positioned on the outer surface of the weather resistive barrier. The meltblown layer may comprise meltblown shot, meltblown ropes, or both.

19 Claims, 5 Drawing Sheets

(51) Int. Cl.

| | | |
|---|---|---|
| *E04B 1/70* | (2006.01) | |
| *E04B 1/62* | (2006.01) | |
| *B32B 5/02* | (2006.01) | |
| *B32B 37/14* | (2006.01) | |
| *B32B 7/04* | (2006.01) | |
| *B32B 7/08* | (2006.01) | |
| *B32B 7/12* | (2006.01) | |
| *B32B 13/12* | (2006.01) | |
| *B32B 13/14* | (2006.01) | |
| *B32B 15/08* | (2006.01) | |
| *B32B 21/02* | (2006.01) | |
| *B32B 21/08* | (2006.01) | |
| *B32B 21/10* | (2006.01) | |
| *B32B 25/08* | (2006.01) | |
| *B32B 27/08* | (2006.01) | |
| *B32B 27/12* | (2006.01) | |
| *B32B 27/20* | (2006.01) | |
| *B32B 27/30* | (2006.01) | |
| *B32B 27/32* | (2006.01) | |
| *B32B 27/34* | (2006.01) | |
| *B32B 27/36* | (2006.01) | |
| *B32B 27/40* | (2006.01) | |
| *B32B 37/06* | (2006.01) | |
| *B32B 3/10* | (2006.01) | |

(52) U.S. Cl.
CPC .......... *B32B 27/304* (2013.01); *B32B 27/306* (2013.01); *B32B 27/32* (2013.01); *B32B 27/34* (2013.01); *B32B 27/36* (2013.01); *B32B 27/365* (2013.01); *B32B 27/40* (2013.01); *B32B 37/06* (2013.01); *B32B 37/14* (2013.01); *B32B 2262/0253* (2013.01); *B32B 2264/104* (2013.01); *B32B 2307/4026* (2013.01); *B32B 2307/50* (2013.01); *B32B 2307/54* (2013.01); *B32B 2307/71* (2013.01); *B32B 2307/712* (2013.01); *B32B 2307/718* (2013.01); *B32B 2307/7145* (2013.01); *B32B 2307/7242* (2013.01); *B32B 2307/7265* (2013.01); *B32B 2307/732* (2013.01); *B32B 2309/105* (2013.01); *B32B 2309/12* (2013.01); *B32B 2419/00* (2013.01); *B32B 2419/04* (2013.01); *B32B 2419/06* (2013.01); *B32B 2607/00* (2013.01)

(56) References Cited

U.S. PATENT DOCUMENTS

| | | | | |
|---|---|---|---|---|
| 4,212,692 | A * | 7/1980 | Rasen | D04H 3/16 156/167 |
| 4,669,246 | A * | 6/1987 | Freeman | E04D 11/02 52/309.8 |
| 4,885,201 | A * | 12/1989 | Brandt | B05D 7/02 428/141 |
| 4,942,699 | A * | 7/1990 | Spinelli | E04D 13/176 454/366 |
| 5,099,627 | A * | 3/1992 | Coulton | E04D 13/17 52/408 |
| 5,728,424 | A | 3/1998 | Walling | |
| 5,786,065 | A | 7/1998 | Annis et al. | |
| 6,131,353 | A * | 10/2000 | Egan | B32B 5/02 52/309.1 |
| 6,804,922 | B1 * | 10/2004 | Egan | B32B 5/02 52/309.1 |
| 7,607,270 | B2 | 10/2009 | Ehrman et al. | |
| 7,807,011 | B2 * | 10/2010 | Dunstan | E04B 1/70 156/308.2 |
| 7,858,174 | B2 | 12/2010 | Ehrman et al. | |
| 7,994,079 | B2 | 8/2011 | Chen et al. | |
| 8,074,409 | B2 | 12/2011 | Goldberg et al. | |
| 8,647,734 | B2 | 2/2014 | Keene | |
| 8,813,443 | B2 | 8/2014 | Goldberg et al. | |
| 9,151,043 | B1 * | 10/2015 | Fritz | E04B 2/28 |
| 9,592,529 | B2 * | 3/2017 | Xiangli | E04B 1/62 |
| 2003/0215594 | A1 * | 11/2003 | Hamdar | B32B 3/08 428/40.1 |
| 2006/0194495 | A1 * | 8/2006 | Lubker, II | B32B 3/16 442/208 |
| 2007/0054579 | A1 * | 3/2007 | Baker, Jr. | A41D 31/02 442/364 |
| 2007/0261365 | A1 * | 11/2007 | Keene | E04F 13/04 52/796.1 |
| 2013/0180203 | A1 | 7/2013 | Xiangli | |
| 2015/0233121 | A1 | 8/2015 | Norwood et al. | |
| 2016/0002914 | A1 * | 1/2016 | Snyder | E04B 1/625 52/309.1 |
| 2016/0176168 | A1 * | 6/2016 | Zhao | B32B 5/022 428/143 |

* cited by examiner

DRAINABLE WEATHER RESISTIVE BARRIER

PRIORITY CLAIM

This application claims priority under 35 U.S.C. § 119(e) to U.S. Provisional Application Ser. No. 62/276,395, filed on Jan. 8, 2016, which is expressly incorporated by reference herein in its entirety.

TECHNICAL FIELD

The invention relates generally to weather resistive barriers, and, more particularly, to weather resistive barriers providing a three-dimensional water drainage surface.

BACKGROUND

Over time, moisture can accumulate within the structure of a building, causing premature deterioration and damage. This problem is particularly common in areas with high humidity and rainfall such as the Pacific Northwest.

To prevent moisture accumulation, particularly in exterior walls, it is beneficial to provide ventilation or drainage passageways within the exterior walls. As such, several weather resistive barriers have been used to force bulk water to drain from a wall structure. These weather resistive barriers employ a physical spacer technique to form an air gap through which the water will flow.

However, these weather resistive barriers may be susceptible to several problems due to their construction. For example, many of these weather resistive barriers can only be used in vertical applications due to the predominately single direction of their ridges and channels formed for water drainage. As a result, these weather resistive barriers may cause issues when used in non-vertical applications such as the gable ends of a roof or other angular installations. Furthermore, these weather resistive barriers run the risk of being crushed during installation, thereby incurring additional labor costs. Other weather resistive barriers provide non-compressible channels, but these barriers tend to exhibit poor drainage performance. Other weather resistive barriers use small line segments of rigid polymer to provide a relatively unidirectional drainage plain, but these weather resistive barriers often are manufactured in narrow widths, are very expensive, and may even require adhesion to a second weather resistive barrier.

Therefore there at least remains a need in the art for an inexpensive drainage weather resistive barrier with superior multidirectional drainage properties, sufficient width, and a sufficient resistance to damage during installation to prevent additional installation labor and costs.

SUMMARY OF INVENTION

One or more embodiments of the invention may address one or more of the aforementioned problems. Certain embodiments, according to the invention, provide drainage promoting fabrics having a wide variety of commercial applications (e.g., housewrap). According to an embodiment of the invention, the drainage promoting fabric includes a weather resistive barrier having an outer surface, and a three-dimensional, non-uniform or non-continuous meltblown layer positioned on the outer surface of the weather resistive barrier. The meltblown layer may comprise meltblown shot, meltblown ropes, or both.

In accordance with certain embodiments of the invention, the drainage promoting fabric may comprise a drainage efficiency from about 75% to about 100% (e.g., about 90% to about 100%). In some embodiments of the invention, the drainage promoting fabric may comprise a drainage efficiency from about 92% to about 98%. In other embodiments of the invention, the drainage promoting fabric may comprise a drainage efficiency from about 94% to about 96%. In further embodiments of the invention, the drainage promoting fabric may comprise a drainage efficiency of about 95%. According to certain embodiments of the invention, the drainage promoting fabric may comprise a width from about 3 feet to about 10 feet.

In accordance with certain embodiments of the invention, the meltblown layer may comprise at least one of a polypropylene, an ethylene-propylene impact copolymer blend, or any combination thereof. In some embodiments of the invention, the meltblown shot may comprise irregularly shaped fibers, wads, or particles. In further embodiments of the invention, the meltblown shot may be randomly and irregularly distributed on the outer surface of the weather resistive barrier. According to certain embodiments of the invention, the meltblown layer further comprises at least one of an anti-microbial additive, an anti-fungal additive, an ultraviolet (UV) stabilizer additive, or any combination thereof.

According to certain embodiments of the invention, the meltblown layer may comprise an average shot height, rope height, or both from about 0.1 mm to about 1.0 mm. In some embodiments of the invention, the meltblown layer may comprise an average shot height, rope height, or both from about 0.25 mm to about 0.75 mm. In other embodiments of the invention, the meltblown layer may comprise an average shot height, rope height, or both from about 0.4 mm to about 0.6 mm. In further embodiments of the invention, the meltblown layer may comprise an average shot height, rope height, or both of about 0.5 mm.

According to certain embodiments of the invention, the meltblown layer may comprise a basis weight from about 1 gsm to about 20 gsm. In some embodiments of the invention, the meltblown layer may comprise a basis weight from about 2 gsm to about 15 gsm. In other embodiments of the invention, the meltblown layer may comprise a basis weight from about 3 gsm to about 10 gsm. In certain embodiments of the invention, the meltblown layer may comprise a basis weight from about 4 gsm to about 6 gsm. In further embodiments of the invention, the meltblown layer may comprise a basis weight of about 5 gsm.

In accordance with certain embodiments of the invention, the weather resistive barrier may comprise a film laminated to a fibrous material. In such embodiments of the invention, the film may comprise a breathable polyolefin film. According to certain embodiments of the invention, the breathable polyolefin film may further comprise calcium carbonate. In some embodiments of the invention, the fibrous material may comprise a woven material. In further embodiments of the invention, the woven material may comprise a polypropylene woven material. In other embodiments of the invention, the fibrous material may comprise a nonwoven material. In such embodiments of the invention, the nonwoven material may comprise a polypropylene nonwoven material. According to certain embodiments of the invention, the nonwoven material may comprise a spunbond layer. In other embodiments of the invention, the nonwoven material may comprise a meltblown layer. In some embodiments of the invention, the weather resistive barrier may comprise from about 60% to about 99% by weight of a polypropylene. In further embodiments of the invention, the film may comprise from about 1% to about 40% by weight of the weather resistive barrier. According to certain embodiments of the invention, the weather resistive barrier may further comprise a UV stabilizer additive. In such embodiments of the invention, the weather resistive barrier may comprise from about 0.1% to about 3% by weight of the UV stabilizer additive. In some embodiments of the invention, the weather resistive barrier may further comprise a pigment, said pigment comprising carbon black and titanium dioxide. In such embodiments of the invention, the weather resistive barrier may comprise from about 0.1% to about 2% by weight of the pigment.

According to certain embodiments of the invention, the weather resistive barrier may comprise a a basis weight from about 50 gsm to about 150 gsm. In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. In certain embodiments of the invention, for example, the weather resistive barrier may comprise a basis weight of 94.94 gsm. According to certain embodiments of the invention, the weather resistive barrier may comprise a thickness from about 5 mils to about 20 mils. In some embodiments of the invention, the weather resistive barrier may comprise a thickness from about 10 mils to about 15 mils. In further embodiments of the invention, the weather resistive barrier may comprise a thickness from about 12 mils to about 13 mils.

According to certain embodiments of the invention, the weather resistive barrier may comprise a bursting strength from about 50 psi to about 100 psi. In some embodiments of the invention, the weather resistive barrier may comprise a bursting strength from about 55 psi to about 75 psi. In further embodiments of the invention, the weather resistive barrier may comprise a bursting strength from about 60 psi to about 70 psi. In other embodiments of the invention, the weather resistive barrier may comprise a bursting strength of about 66 psi. In certain embodiments of the invention, the weather resistive barrier may comprise a trapezoidal tear strength of about 30/33 as tested by ASTM D-5733-9.

According to certain embodiments of the invention, the weather resistive barrier may comprise a hydrostatic pressure resistance from about 800 cm to about 1000 cm. In other embodiments of the invention, the weather resistive barrier may comprise a hydrostatic pressure resistance from about 825 cm to about 900 cm. In further embodiments of the invention, the weather resistive barrier may comprise a hydrostatic pressure resistance from about 850 cm to about 875 cm. In certain embodiments of the invention, the weather resistive barrier may comprise a hydrostatic pressure resistance from about 860 cm to about 870 cm. In some embodiments of the invention, the weather resistive barrier may comprise a hydrostatic pressure resistance of about 865 cm. According to certain embodiments of the invention, the weather resistive barrier may comprise a Gurley Hill Porosity from about 2500 s/100 cc to about 5000 s/100 cc.

In accordance with certain embodiments of the invention, the weather resistive barrier may comprise a moisture vapor transmission rate (MVTR) from about 5 US perms to about 30 US perms. In some embodiments of the invention, the weather resistive barrier may comprise an MVTR from about 7 US perms to about 20 US perms. In other embodiments of the invention, the weather resistive barrier may comprise an MVTR from about 10 US perms to about 15 US perms. In further embodiments of the invention, the weather resistive barrier may comprise an MVTR from about 11 US perms to about 12 US perms.

According to certain embodiments of the invention, the weather resistive barrier may comprise an UV light exposure resistance from about 4 months to about 12 months. In some embodiments of the invention, the weather resistive barrier may comprise a UV light exposure resistance from about 5 months to about 7 months. In other embodiments of the invention, the weather resistive barrier may comprise a UV light exposure resistance of about 6 months. In certain embodiments of the invention, the weather resistive barrier may comprise an air leakage from about 0.001 L(S·M$^2$) to 0.005 L(S·M$^2$) at 75 pascals. In some embodiments of the invention, the weather resistive barrier may comprise an air leakage from about 0.002 L(S·M$^2$) to 0.004 L(S·M$^2$) at 75 pascals. In further embodiments of the invention, the weather resistive barrier may comprise an air leakage from about 0.0025 L(S·M$^2$) to 0.0035 L(S·M$^2$) at 75 pascals.

Another aspect provides a building assembly. According to an embodiment of the invention, the building assembly includes an inner sheathing member, an exterior building material, and a drainage promoting fabric positioned between the inner sheathing member and the exterior building material. In some embodiments of the invention, the drainage promoting fabric may include a weather resistive barrier having an outer surface, and a three-dimensional, non-uniform or non-continuous meltblown layer positioned on the outer surface of the weather resistive barrier. The meltblown layer may comprise meltblown shot, meltblown ropes, or both.

In accordance with certain embodiments of the invention, the drainage promoting fabric may comprise a drainage efficiency from about 75% to about 100% (e.g., about 90% to about 100%). In some embodiments of the invention, the drainage promoting fabric may comprise a drainage efficiency from about 92% to about 98%. In other embodiments of the invention, the drainage promoting fabric may comprise a drainage efficiency from about 94% to about 96%. In further embodiments of the invention, the drainage promoting fabric may comprise a drainage efficiency of about 95%. According to certain embodiments of the invention, the drainage promoting fabric may comprise a width from about 3 feet to about 10 feet.

In accordance with certain embodiments of the invention, the meltblown layer may comprise at least one of a polypropylene, an ethylene-propylene impact copolymer blend, or any combination thereof. In some embodiments of the invention, the meltblown shot may comprise irregularly shaped fibers, wads, or particles. In further embodiments of the invention, the meltblown shot may be randomly and irregularly distributed on the outer surface of the weather resistive barrier. According to certain embodiments of the invention, the meltblown layer further comprises at least one of an anti-microbial additive, an anti-fungal additive, an ultraviolet (UV) stabilizer additive, or any combination thereof.

According to certain embodiments of the invention, the meltblown layer may comprise an average shot height, rope height, or both from about 0.1 mm to about 1.0 mm. In some embodiments of the invention, the meltblown layer may comprise an average shot height, rope height, or both from about 0.25 mm to about 0.75 mm. In other embodiments of the invention, the meltblown layer may comprise an average shot height, rope height, or both from about 0.4 mm to about 0.6 mm. In further embodiments of the invention, the meltblown layer may comprise an average shot height, rope height, or both of about 0.5 mm. In some embodiments of the invention, the meltblown shot, the meltblown rope, or a combination thereof may define a continuous air gap between the weather resistive barrier and the exterior building material. In such embodiments of the invention, the continuous air gap comprises a height corresponding to the average shot height, rope height, or both.

According to certain embodiments of the invention, the meltblown layer may comprise a basis weight from about 1 gsm to about 20 gsm. In some embodiments of the invention, the meltblown layer may comprise a basis weight from about 2 gsm to about 15 gsm. In other embodiments of the invention, the meltblown layer may comprise a basis weight from about 3 gsm to about 10 gsm. In certain embodiments of the invention, the meltblown layer may comprise a basis weight from about 4 gsm to about 6 gsm. In further embodiments of the invention, the meltblown layer may comprise a basis weight of about 5 gsm.

In accordance with certain embodiments of the invention, the weather resistive barrier may comprise a film laminated to a fibrous material. In such embodiments of the invention, the film may comprise a breathable polyolefin film. According to certain embodiments of the invention, the breathable polyolefin film may further comprise calcium carbonate. In some embodiments of the invention, the fibrous material may comprise a woven material. In further embodiments of the invention, the woven material may comprise a polypropylene woven material. In other embodiments of the invention, the fibrous material may comprise a nonwoven material. In such embodiments of the invention, the nonwoven material may comprise a polypropylene nonwoven material. According to certain embodiments of the invention, the nonwoven material may comprise a spunbond layer. In other embodiments of the invention, the nonwoven material may comprise a meltblown layer. In some embodiments of the invention, the weather resistive barrier may comprise from about 60% to about 99% by weight of a polypropylene. In further embodiments of the invention, the film may comprise from about 1% to about 40% by weight of the weather resistive barrier. According to certain embodiments of the invention, the weather resistive barrier may further comprise a UV stabilizer additive. In such embodiments of the invention, the weather resistive barrier may comprise from about 0.1% to about 3% by weight of the UV stabilizer additive. In some embodiments of the invention, the weather resistive barrier may further comprise a pigment, said pigment comprising carbon black and titanium dioxide. In such embodiments of the invention, the weather resistive barrier may comprise from about 0.1% to about 2% by weight of the pigment.

According to certain embodiments of the invention, the weather resistive barrier may comprise a basis weight from about 50 gsm to about 150 gsm. In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. According to certain embodiments of the invention, the weather resistive barrier may comprise a thickness from about 5 mils to about 20 mils. In some embodiments of the invention, the weather resistive barrier may comprise a thickness from about 10 mils to about 15 mils. In further embodiments of the invention, the weather resistive barrier may comprise a thickness from about 12 mils to about 13 mils.

According to certain embodiments of the invention, the weather resistive barrier may comprise a bursting strength from about 50 psi to about 100 psi. In some embodiments of the invention, the weather resistive barrier may comprise a bursting strength from about 55 psi to about 75 psi. In further embodiments of the invention, the weather resistive barrier may comprise a bursting strength from about 60 psi to about 70 psi. In other embodiments of the invention, the weather resistive barrier may comprise a bursting strength of about 66 psi. In certain embodiments of the invention, the weather resistive barrier may comprise a trapezoidal tear strength of about 30/33 as tested by ASTM D-5733-9.

According to certain embodiments of the invention, the weather resistive barrier may comprise a hydrostatic pressure resistance from about 800 cm to about 1000 cm. In other embodiments of the invention, the weather resistive barrier may comprise a hydrostatic pressure resistance from about 825 cm to about 900 cm. In further embodiments of the invention, the weather resistive barrier may comprise a hydrostatic pressure resistance from about 850 cm to about 875 cm. In certain embodiments of the invention, the weather resistive barrier may comprise a hydrostatic pressure resistance from about 860 cm to about 870 cm. In some embodiments of the invention, the weather resistive barrier may comprise a hydrostatic pressure resistance of about 865 cm. According to certain embodiments of the invention, the weather resistive barrier may comprise a Gurley Hill Porosity from about 2500 s/100 cc to about 5000 s/100 cc.

In accordance with certain embodiments of the invention, the weather resistive barrier may comprise a moisture vapor transmission rate (MVTR) from about 5 US perms to about 30 US perms. In some embodiments of the invention, the weather resistive barrier may comprise an MVTR from about 7 US perms to about 20 US perms. In other embodiments of the invention, the weather resistive barrier may comprise an MVTR from about 10 US perms to about 15 US perms. In further embodiments of the invention, the weather resistive barrier may comprise an MVTR from about 11 US perms to about 12 US perms.

According to certain embodiments of the invention, the weather resistive barrier may comprise an UV light exposure resistance from about 4 months to about 12 months. In some embodiments of the invention, the weather resistive barrier may comprise a UV light exposure resistance from about 5 months to about 7 months. In other embodiments of the invention, the weather resistive barrier may comprise a UV light exposure resistance of about 6 months. In certain embodiments of the invention, the weather resistive barrier may comprise an air leakage from about 0.001 L(S·M$^2$) to 0.005 L(S·M$^2$) at 75 pascals. In some embodiments of the invention, the weather resistive barrier may comprise an air leakage from about 0.002 L(S·M$^2$) to 0.004 L(S·M$^2$) at 75 pascals. In further embodiments of the invention, the weather resistive barrier may comprise an air leakage from about 0.0025 L(S·M$^2$) to 0.0035 L(S·M$^2$) at 75 pascals In yet another aspect, a process for forming a drainage promoting fabric is provided. In accordance with an embodiment of the invention, the process includes providing a weather resistive barrier, providing a three-dimensional, non-uniform or non-continuous meltblown layer, and attaching the meltblown layer to the weather resistive barrier. In such embodiments of the invention, the meltblown layer may comprise meltblown shot, meltblown ropes, or both. In some embodiments of the invention, attaching the meltblown layer to the weather resistive barrier may comprise meltspinning the meltblown layer directly onto the weather resistive barrier. In other embodiments of the invention, attaching the meltblown layer to the weather resistive barrier may comprise preparing the meltblown layer separately from the weather resistive barrier, and attaching the prepared meltblown layer to the weather resistive barrier. In such embodiments of the invention, attaching the prepared meltblown layer to the weather resistive barrier may comprise at least one of thermal bonding, adhesive bonding, sonic bonding, mechanical bonding, or any combination thereof. In further embodiments of the invention, the process may further comprise forming the weather resistive barrier.

In accordance with certain embodiments of the invention, the drainage promoting fabric may comprise a drainage efficiency from about 75% to about 100% (e.g., about 90% to about 100%). In some embodiments of the invention, the drainage promoting fabric may comprise a drainage efficiency from about 92% to about 98%. In other embodiments of the invention, the drainage promoting fabric may comprise a drainage efficiency from about 94% to about 96%. In further embodiments of the invention, the drainage promoting fabric may comprise a drainage efficiency of about 95%. According to certain embodiments of the invention, the drainage promoting fabric may comprise a width from about 3 feet to about 10 feet.

In accordance with certain embodiments of the invention, the meltblown layer may comprise at least one of a polypropylene, an ethylene-propylene impact copolymer blend, or any combination thereof. In some embodiments of the invention, the meltblown shot may comprise irregularly shaped fibers, wads, or particles. In further embodiments of the invention, the meltblown shot may be randomly and irregularly distributed on the outer surface of the weather resistive barrier. According to certain embodiments of the invention, the meltblown layer further comprises at least one of an anti-microbial additive, an anti-fungal additive, an ultraviolet (UV) stabilizer additive, or any combination thereof.

According to certain embodiments of the invention, the meltblown layer may comprise an average shot height, rope height, or both from about 0.1 mm to about 1.0 mm. In some embodiments of the invention, the meltblown layer may comprise an average shot height, rope height, or both from about 0.25 mm to about 0.75 mm. In other embodiments of the invention, the meltblown layer may comprise an average shot height, rope height, or both from about 0.4 mm to about 0.6 mm. In further embodiments of the invention, the meltblown layer may comprise an average shot height, rope height, or both of about 0.5 mm.

According to certain embodiments of the invention, the meltblown layer may comprise a basis weight from about 1 gsm to about 20 gsm. In some embodiments of the invention, the meltblown layer may comprise a basis weight from about 2 gsm to about 15 gsm. In other embodiments of the invention, the meltblown layer may comprise a basis weight from about 3 gsm to about 10 gsm. In certain embodiments of the invention, the meltblown layer may comprise a basis weight from about 4 gsm to about 6 gsm. In further embodiments of the invention, the meltblown layer may comprise a basis weight of about 5 gsm.

In accordance with certain embodiments of the invention, the weather resistive barrier may comprise a film laminated to a fibrous material. In such embodiments of the invention, the film may comprise a breathable polyolefin film. According to certain embodiments of the invention, the breathable polyolefin film may further comprise calcium carbonate. In some embodiments of the invention, the fibrous material may comprise a woven material. In further embodiments of the invention, the woven material may comprise a polypropylene woven material. In other embodiments of the invention, the fibrous material may comprise a nonwoven material. In such embodiments of the invention, the nonwoven material may comprise a polypropylene nonwoven material. According to certain embodiments of the invention, the nonwoven material may comprise a spunbond layer. In other embodiments of the invention, the nonwoven material may comprise a meltblown layer. In some embodiments of the invention, the weather resistive barrier may comprise from about 60% to about 99% by weight of a polypropylene. In further embodiments of the invention, the film may comprise from about 1% to about 40% by weight of the weather resistive barrier. According to certain embodiments of the invention, the weather resistive barrier may further comprise a UV stabilizer additive. In such embodiments of the invention, the weather resistive barrier may comprise from about 0.1% to about 3% by weight of the UV stabilizer additive. In some embodiments of the invention, the weather resistive barrier may further comprise a pigment, said pigment comprising carbon black and titanium dioxide. In such embodiments of the invention, the weather resistive barrier may comprise from about 0.1% to about 2% by weight of the pigment.

According to certain embodiments of the invention, the weather resistive barrier may comprise a basis weight from about 50 gsm to about 150 gsm. In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. In certain embodiments of the invention, for example, the weather resistive barrier may comprise a basis weight of 94.94 gsm. According to certain embodiments of the invention, the weather resistive barrier may comprise a thickness from about 5 mils to about 20 mils. In some embodiments of the invention, the weather resistive barrier may comprise a thickness from about 10 mils to about 15 mils. In further embodiments of the invention, the weather resistive barrier may comprise a thickness from about 12 mils to about 13 mils.

According to certain embodiments of the invention, the weather resistive barrier may comprise a bursting strength from about 50 psi to about 100 psi. In some embodiments of the invention, the weather resistive barrier may comprise a bursting strength from about 55 psi to about 75 psi. In further embodiments of the invention, the weather resistive barrier may comprise a bursting strength from about 60 psi to about 70 psi. In other embodiments of the invention, the weather resistive barrier may comprise a bursting strength of about 66 psi. In certain embodiments of the invention, the weather resistive barrier may comprise a trapezoidal tear strength of about 30/33 as tested by ASTM D-5733-9.

According to certain embodiments of the invention, the weather resistive barrier may comprise a hydrostatic pressure resistance from about 800 cm to about 1000 cm. In other embodiments of the invention, the weather resistive barrier may comprise a hydrostatic pressure resistance from about 825 cm to about 900 cm. In further embodiments of the invention, the weather resistive barrier may comprise a hydrostatic pressure resistance from about 850 cm to about 875 cm. In certain embodiments of the invention, the weather resistive barrier may comprise a hydrostatic pressure resistance from about 860 cm to about 870 cm. In some embodiments of the invention, the weather resistive barrier may comprise a hydrostatic pressure resistance of about 865 cm. According to certain embodiments of the invention, the weather resistive barrier may comprise a Gurley Hill Porosity from about 2500 s/100 cc to about 5000 s/100 cc.

In accordance with certain embodiments of the invention, the weather resistive barrier may comprise a moisture vapor transmission rate (MVTR) from about 5 US perms to about 30 US perms. In some embodiments of the invention, the weather resistive barrier may comprise an MVTR from about 7 US perms to about 20 US perms. In other embodiments of the invention, the weather resistive barrier may comprise an MVTR from about 10 US perms to about 15 US perms. In further embodiments of the invention, the weather resistive barrier may comprise an MVTR from about 11 US perms to about 12 US perms.

According to certain embodiments of the invention, the weather resistive barrier may comprise an UV light exposure resistance from about 4 months to about 12 months. In some embodiments of the invention, the weather resistive barrier may comprise a UV light exposure resistance from about 5 months to about 7 months. In other embodiments of the invention, the weather resistive barrier may comprise a UV light exposure resistance of about 6 months. In certain embodiments of the invention, the weather resistive barrier may comprise an air leakage from about 0.001 L(S·M$^2$) to 0.005 L(S·M$^2$) at 75 pascals. In some embodiments of the invention, the weather resistive barrier may comprise an air leakage from about 0.002 L(S·M$^2$) to 0.004 L(S·M$^2$) at 75 pascals. In further embodiments of the invention, the weather resistive barrier may comprise an air leakage from about 0.0025 L(S·M$^2$) to 0.0035 L(S·M$^2$) at 75 pascals.

Still other objects and features will become apparent from the following detailed description considered in conjunction with the accompanying drawings.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
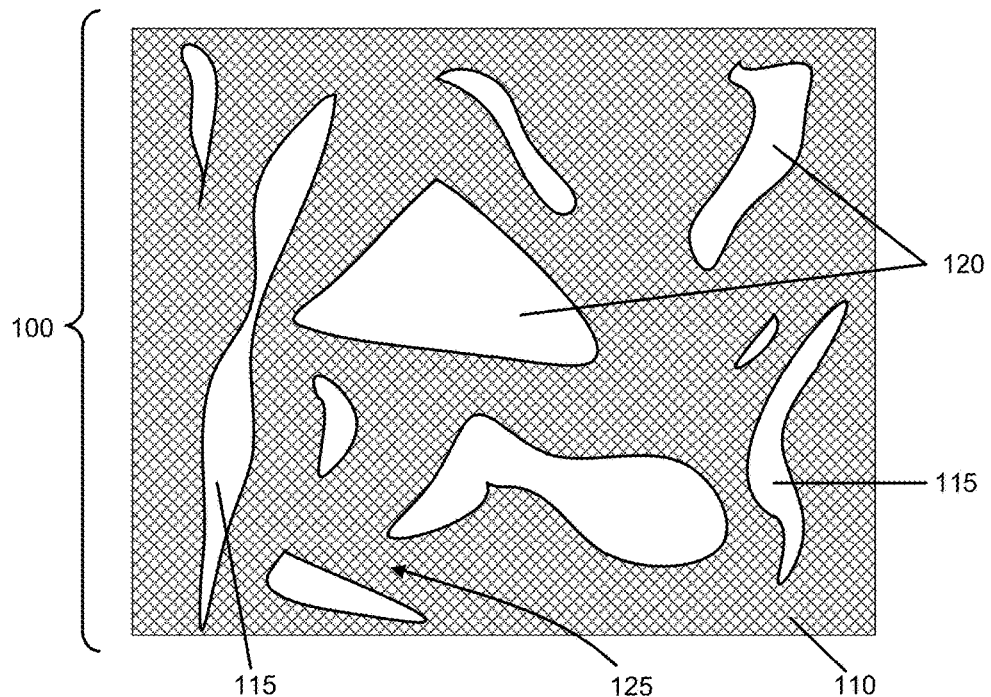
FIG. 1 illustrates a top view of a drainage promoting fabric according to an embodiment of the invention.

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

It is to be understood, however, that the drawings are designed solely for purposes of illustration and not as a definition of the limits of the invention, for which reference should be made to the appended claims. Any relative dimensions illustrated in the figures are given by way of example and are not intended to be limiting. As would be appreciated by a person having ordinary skill in the art, the relative dimensions can vary depending on any number of factors including, without limitation, the intended use and performance of the illustrated article.

The invention includes, according to certain embodiments, drainage promoting fabrics having a wide variety of commercial applications (e.g., housewrap). In this regard, certain embodiments of the invention are directed to inexpensive drainage promoting fabrics with superior multidirectional drainage properties, sufficient width, and a sufficient resistance to damage during installation to prevent additional installation labor and costs.

I. Definitions

The terms "substantial" or "substantially" may encompass the whole amount as specified, according to certain embodiments of the invention, or largely but not the whole amount specified according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantionmers; and/or any chiral molecular configuration of such polymer or polymeric material. These configurations include, but are not limited to, isotactic, syndiotactic, and atactic configurations of such polymer or polymeric material.

The term "layer", as used herein, may comprise a generally recognizable combination of similar material types and/or functions existing in the X-Y plane.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, hydroentangling, air-laid, and bonded carded web processes.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous. It is noted that the spunbond used in certain composites of the invention may include nonwoven described in the literature as SPIN-LACE®.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers are microfibers which may be continuous or discontinuous and are generally tacky when deposited onto a collecting surface.

The term "meltblown shot", as used herein, may comprise a coarse non-uniform or non-continuous layer applied in a meltblown process deliberately operated to generate random globules of a polymer interconnected with strands. Moreover, the term "meltblown rope", as used herein, may also comprise a coarse non-uniform or non-continuous layer applied in a meltblown process deliberately operated to generate random "ropes" or bundles of a polymer interconnected with strands. Meltblown rope differs from meltblown shot in that meltblown rope may be more elongated and/or narrower than meltblown shot. Both the meltblown ropes and/or meltblown shot may comprise irregularly shaped fibers, wads, or particles. In this regard, for example, the meltblown ropes and/or meltblown shot may comprise fibers, wads, particles, or globules having non-circular cross-sections. The meltblown ropes and/or meltblown shot may be randomly and irregularly distributed on a surface. For example, the meltblown ropes and/or meltblown shot may extend on random paths and may intersect and/or cross at random locations. However, the meltblown ropes and/or meltblown shot may not intersect or cross at all.

The term "non-continuous", as used herein, may comprise a layer of meltblown shot and/or meltblown ropes. The meltblown shot and/or meltblown ropes may be isolated from each other, although some of the meltblown shot and/or meltblown ropes may connect to each other. In this regard, a non-continuous meltblown layer deposited onto an underlying material (e.g., a weather resistive barrier) would not cover 100% of the surface area of the underlying material. The term "non-uniform", as used herein, may comprise a continuous layer of meltblown fibers having varying thicknesses throughout and including three-dimensional portions including meltblown shot, meltblown ropes and/or the like.

The term "filler", as used herein, may comprise particles or aggregates of particles and other forms of materials that can be added to a polymeric film blend. According to certain embodiments of the invention, a filler will not substantially chemically interfere with or adversely affect the extruded material. According to certain embodiments of the invention, the filler is capable of being uniformly dispersed throughout the material or a layer comprised in a multilayer composite.

The term "film", as used herein, may comprise a polymeric or elastomeric layer or layers made using a film extrusion process, such as a cast film or blown film extrusion process. This term may also include films rendered microporous by mixing polymer and/or elastomer with filler, forming a film from the mixture, and optionally stretching the film.

The term "microporous" film, as used herein, may comprise films or membranes having a narrow pore sized distribution in the submicron range, from 1.0 to 10 microns. The microporous films can be made by a number of processes, which include (a) dissolving polymers in solution followed by extraction of the solvent by water vapor, (b) stretching of crystallizable polymers which results in micro-sized tears, and (c) stretching of a mineral filled polyolefin film. The polymers used in the microporous films include PTFE, polyolefins, polyurethanes, polyamides, and polyesters.

As used herein, the term "monolithic" film may comprise any film that is continuous and substantially free or free of pores. In certain alternative embodiments of the invention, a "monolithic" film may comprise fewer pore structures than would otherwise be found in a microporous film. According to certain non-limiting exemplary embodiments of the invention, a monolithic film may act as a barrier to liquids and particulate matter but allow water vapor to pass through.

The term "bicomponent fibers", as used herein, may comprise fibers formed from at least two different polymers extruded from separate extruders but spun together to form one fiber. Bicomponent fibers are also sometimes referred to as conjugate fibers or multicomponent fibers. The polymers are arranged in a substantially constant position in distinct zones across the cross-section of the bicomponent fibers and extend continuously along the length of the bicomponent fibers. The configuration of such a bicomponent fiber may be, for example, a sheath/core arrangement wherein one polymer is surrounded by another, or may be a side-by-side arrangement, a pie arrangement, or an "islands-in-the-sea" arrangement, each as is known in the art of multicomponent, including bicomponent, fibers. The "bicomponent fibers" may be thermoplastic fibers that comprise a core fiber made from one polymer that is encased within a thermoplastic sheath made from a different polymer or have a side-by-side arrangement of different thermoplastic fibers. The first polymer often melts at a different, typically lower, temperature than the second polymer. In the sheath/core arrangement, these bicomponent fibers provide thermal bonding due to melting of the sheath polymer, while retaining the desirable strength characteristics of the core polymer. In the side-by-side arrangement, the fibers shrink and crimp creating z-direction expansion.

The term "weather resistive barrier", as used herein, may comprise a material, such as a sheet-like material, that may function as an air barrier to generally prevent air penetration to mitigate against drafts and provide bulk water resistance to help prevent bulk water from passing there-through. In certain embodiments, a "weather resistive barrier", as used herein, may also provide moderate to high vapor permeability to allow and water that may become "trapped" behind the weather resistive barrier to evaporate to prevent the formation of mold. Such materials may generally be marketed as a "housewrap". In accordance with certain embodiments of the invention, the weather resistive barrier may include any current or future commercially available housewrap. Examples of weather resistive barriers, which are currently marketed as housewraps, include (but not limited to) TYPAR® (by AVINTIV Specialty Materials Inc. of Charlotte, N.C.), Tyvek® line or wraps (DuPont™, U.S.A.), Fabrene® Air-Gard® (by AVINTIV Specialty Materials Inc. of Charlotte, N.C.), Fabrene® Air-Gard® Value (by AVINTIV Specialty Materials Inc. of Charlotte, N.C.), Fabrene® Air-Gard® XL (by AVINTIV Specialty Materials Inc. of Charlotte, N.C.), and CertaWrap™ (CertainTeed Corporation, U.S.A.). In this regard, the structure of weather resistive barriers can vary, including micro-porous films, monolithic films, fibrous structures (e.g., woven and/or nonwoven materials), and composite-type materials including a fibrous structure coupled with a film, such as TYPAR®. In certain embodiments of the invention, the weather resistive barrier may be devoid of any film, such as Tyvek®. Tyvek®, for instance, utilizes fine high-density polyethylene (HDPE) spun fibers that are fused together to form a uniform web having numerous extremely small pores that resist bulk water and air penetration, while allowing moisture vapor to pass.

II. Drainage Promoting Fabric

A drainage promoting fabric (e.g., housewrap) may be configured to provide a barrier to water and/or air infiltration while also permitting water vapor to escape outwardly through a wall or roof of a building by including a three-dimensional, non-uniform or non-continuous meltblown layer deposited on a weather resistive barrier. For example, weather resistive barriers marketed under the names TYPAR® (by AVINTIV Specialty Materials Inc. of Charlotte, N.C.), Tyvek® line or wraps (DuPont™, U.S.A.), Fabrene® Air-Gard® (by AVINTIV Specialty Materials Inc. of Charlotte, N.C.), Fabrene® Air-Gard® Value (by AVINTIV Specialty Materials Inc. of Charlotte, N.C.), Fabrene® Air-Gard® XL (by AVINTIV Specialty Materials Inc. of Charlotte, N.C.), and CertaWrap™ (CertainTeed Corporation, U.S.A.) provide protection against water and air infiltration in walls. However, these weather resistive barriers do not provide multidirectional drainage properties.

According to an embodiment of the invention, the drainage promoting fabric may be designed or configured to provide a three-dimensional, non-uniform or non-continuous meltblown layer attached to a weather resistive barrier (e.g., any future or current commercially available weather resistive barrier) such that the meltblown layer has a plurality of protrusions comprising irregularly spaced and shaped meltblown ropes, meltblown shot, or both. In this regard, the drainage promoting fabric provides an inexpensive housewrap having superior multidirectional drainage capabilities. In this regard, for example, the multidirectional drainage properties associated with certain embodiments of the invention beneficially enable installation of such embodiments in a variety of patterns and locations on buildings which is not realized by traditional drainage promoting materials. Accordingly, certain embodiments of the invention enable an increased level of ease in securing a drainage promoting fabric to a building while maintaining superior drainage capabilities due to, at least in part, the multidirectional drainage capabilities of certain embodiments of the invention.

In one aspect, the drainage promoting fabric includes a weather resistive barrier having an outer surface, and a three-dimensional, non-uniform or non-continuous meltblown layer positioned on the outer surface of the weather resistive barrier. The meltblown layer may comprise meltblown shot, meltblown ropes, or both.

Figure 2:
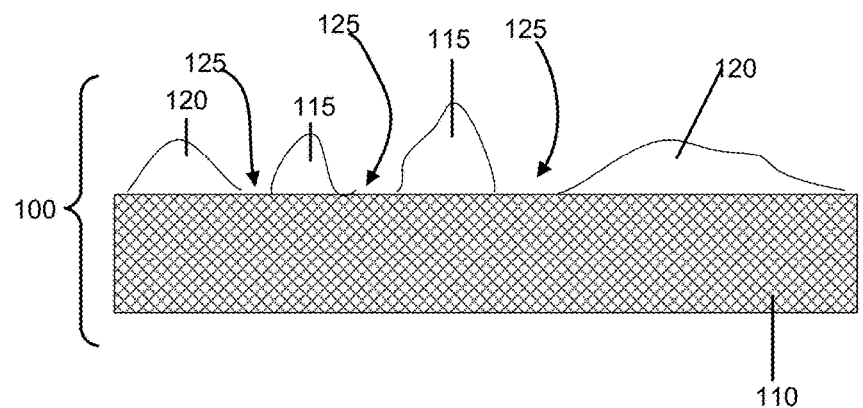
FIG. 2 illustrates a side view of a drainage promoting fabric according to an embodiment of the invention.

FIG. 1, for instance, illustrates a top view of a drainage promoting fabric according to an example embodiment. FIG. 2, for example, illustrates a side view of a drainage promoting fabric according to an embodiment of the invention. As shown in FIG. 1 and FIG. 2, for example, the drainage promoting fabric 100 includes a weather resistive barrier 110 and a non-continuous meltblown layer having a plurality of three-dimensional protrusions in the form of meltblown ropes 115 and meltblown shot 120. As illustrated in FIG. 1 and FIG. 2, the meltblown ropes 115 and meltblown shot 120 are generally isolated from each other (e.g., a non-continuous meltblown layer). In this regard, continuous air gaps 125 may be formed between the meltblown ropes 115 and/or meltblown shot 120. FIG. 2 for instance, illustrates a side view of a drainage promoting fabric according to an example embodiment. As shown in FIG. 2, for example, the meltblown layer of the drainage promoting fabric 100 may comprise a non-continuous layer positioned on top of the weather resistive barrier 110. The meltblown ropes 115 and meltblown shot 120 may be irregularly shaped and irregularly distributed on top of the weather resistive barrier 110 such that the continuous air gaps 125 may also be irregularly shaped and irregularly distributed. Although FIG. 1 and FIG. 2 illustrate a non-continuous meltblown layer, certain embodiments of the invention may comprise a non-uniform meltblown layer instead of a non-continuous meltblown layer, as disclosed herein. In such embodiments, for example, the non-uniform meltblown layer may comprise individual meltblown shot and/or meltblown ropes integrated within a continuous layer of interconnected meltblown fibers and essentially covering or overlying the entire surface of the weather resistive barrier.

In accordance with certain embodiments of the invention, for instance, the drainage promoting fabric may comprise a drainage efficiency from about 75% to about 100% (e.g., about 90% to about 100%). In some embodiments of the invention, for example, the drainage promoting fabric may comprise a drainage efficiency from about 92% to about 98%. In other embodiments of the invention, for instance, the drainage promoting fabric may comprise a drainage efficiency from about 94% to about 96%. In further embodiments of the invention, for example, the drainage promoting fabric may comprise a drainage efficiency of about 95%. As such, in certain embodiments of the invention, the drainage promoting fabric may comprise a drainage efficiency of at least about any of the following: 70, 75, 80, 85, 90, 91, 92, 93, 94, and 95% and/or at most about 100, 99, 98, 97, 96, 95, 90, and 85% (e.g., about 75-99%, about 80-90%, etc.). Drainage efficiency was tested in a way that is consistent with the ASTM test method E-2273.

According to certain embodiments of the invention, for instance, the drainage promoting fabric may comprise a width from about 3 feet to about 10 feet. As such, in certain embodiments of the invention, the drainage promoting fabric may comprise a width from at least about any of the following: 3, 4, 5, 6, 7, 8, 9, and 10 feet and/or at most about 10 feet (e.g., about 7-10 feet, about 3-9 feet, etc.). However, the drainage promoting fabric may comprise any suitable width to be used, for example, as housewrap. Moreover, for example, the drainage promoting fabric may comprise a length longer and/or greater than the width. For instance, the drainage promoting fabric may comprise a length from about 95 feet to about 200 feet. As such, in certain embodiments of the invention, the drainage promoting fabric may comprise a length from at least about any of the following: 95, 100, 105, 110, 115, 120, 125, 130, 135, 140, 145, 150, 155, 160, 165, 170, 175, 180, 185, 190, 195, and 200 feet and/or at most about 200 feet (e.g., about 145-195 feet, about 95-175 feet, etc.). However, the drainage promoting fabric may comprise any suitable length to be used, for instance, as housewrap.

In accordance with certain embodiments of the invention, for example, the meltblown layer may comprise at least one of a polypropylene, an ethylene-propylene impact copolymer blend, or any combination thereof. In some embodiments of the invention, for instance, the meltblown layer may comprise an ethylene-propylene impact copolymer blend. In other embodiments of the invention, for instance, the meltblown layer may comprise at least one thermoplastic polymer suitable for fiber formation in a meltblown process as understood by one of ordinary skill in the art. For example, the meltblown layer may comprise at least one of a polyolefin, a polyester, a polypropylene, a high density polypropylene, a polyvinyl chloride, a vinylidene chloride, a polytetrafluoroethylene, a polyetherester, a nylon, a polyamide, a polycarbonate, a poly(methyl) acrylate, a polyoxymethylene, a polystyrene, a polycaprolactam, an acrylonitrile butadiene styrene, a thermoplastic starch, a polyvinyl alcohol, a polylactic acid, a polyphenylsulfide, a poly-ether-ether-ketone, a polyvinylidene, a polyurethane, a polyurea and/or the like. In accordance with certain embodiments of the invention, the meltblown layer may comprise a polyethylene, such as a low-density polyethylene and high-density polyethylene. In further embodiments of the invention, for instance, the meltblown layer may comprise at least one of a thermosetting polymer, a photocurable polymer and/or the like. In certain embodiments of the invention, for example, the meltblown layer may comprise bicomponent or multicomponent fibers. According to certain embodiments of the invention, for example, the meltblown layer further comprises at least one of an anti-microbial additive, an anti-fungal additive, an ultraviolet (UV) stabilizer additive, or any combination thereof.

Moreover, in further embodiments of the invention, for instance, the meltblown layer may comprise an average fiber diameter from about 30 microns to about 800 microns. In some embodiments of the invention, for example, the meltblown layer may comprise an average fiber diameter from about 40 microns to about 600 microns. In other embodiments of the invention, for instance, the meltblown layer may comprise an average fiber diameter from about 50 microns to about 400 microns. In certain embodiments of the invention, for example, the meltblown layer may comprise an average fiber diameter from about 60 microns to about 300 microns. In further embodiments of the invention, for instance, the meltblown layer may comprise an average fiber diameter from about 70 microns to about 250 microns. As such, in certain embodiments, the meltblown layer may comprise an average fiber diameter from at least about any of the following: 30, 35, 40, 45, 50, 55, 60, 65, and 70 microns and/or at most about 800, 750, 700, 650, 600, 550, 500, 450, 400, 350, 300, and 250 microns (e.g., about 40-600 microns, about 70-800 microns, etc.). In this regard, the fibers may be substantially coarser than conventional meltblown fibers. Moreover, in some embodiments of the invention, for example, the fibers may comprise an average fiber length of at least about 1 cm (e.g., about 1-10 cm). In other embodiments of the invention, for instance, the fibers may comprise an average fiber length of at least about 2 cm (e.g., about 2-10 cm). As such, in certain embodiments of the invention, the fibers may comprise an average fiber length from at least about any of the following: 1, 2, 3, 4, 5, 6, 7, 8, 9, and 10 cm and/or at most about 10, 9, 8, 7, 6, 5, 4, and 3 cm (e.g., about 3-10 cm, about 2-5 cm, etc.).

In some embodiments of the invention, for instance, the meltblown ropes and/or meltblown shot may comprise irregularly shaped fibers, wads, or particles. In this regard, for example, the meltblown ropes and/or meltblown shot may comprise fibers, wads, particles, or globules having non-circular cross-sections. In further embodiments of the invention, for example, the meltblown ropes and/or meltblown shot may be randomly and irregularly distributed throughout the meltblown layer, which may be positioned on the outer surface, in embodiments of the invention including a non-uniform meltblown layer or on the weather resistive barrier in embodiments of the invention including a non-continuous meltblown layer. For example, the meltblown ropes and/or meltblown shot may extend on random paths and may intersect and/or cross at random locations. However, in some embodiments of the invention, for instance, the meltblown ropes and/or meltblown shot may not intersect or cross at all.

In accordance with certain embodiments of the invention, for example, the meltblown layer (e.g., a non-continuous meltblown layer) may comprise from about 10% to about 90% of the surface area of the weather resistive barrier. In other embodiments of the invention, for instance, the meltblown layer may comprise from about 20% to about 80% of the surface area of the weather resistive barrier. In further embodiments of the invention, for example, the meltblown layer may comprise from about 30% to about 70% of the surface area of the weather resistive barrier. In some embodiments of the invention, for instance, the meltblown layer may comprise from about 40% to about 60% of the surface area of the weather resistive barrier. As such, in certain embodiments, the meltblown layer (e.g., a non-continuous meltblown layer) may comprise a percentage of the surface area of the weather resistive barrier from at least about any of the following: 5, 10, 15, 20, 25, 30, 35, and 40% and/or at most about 90, 85, 80, 75, 70, 65, and 60% (e.g., about 15-75%, about 30-85%, etc.).

According to certain embodiments of the invention, for instance, the meltblown layer may comprise an average shot height, rope height, or both (i.e. extending in the Z-direction) from about 0.1 mm to about 1.0 mm. In some embodiments of the invention, for example, the meltblown layer may comprise an average shot height, rope height, or both from about 0.25 mm to about 0.75 mm. In other embodiments of the invention, for instance, the meltblown layer may comprise an average shot height, rope height, or both from about 0.4 mm to about 0.6 mm. In further embodiments of the invention, for example, the meltblown layer may comprise an average shot height, rope height, or both of about 0.5 mm. As such, in certain embodiments of the invention, the meltblown layer may comprise an average shot height, rope height, or both from at least about any of the following: 0.1, 0.15, 0.2, 0.25, 0.3, 0.35, 0.4, 0.45, and 0.5 mm and/or at most about 1.0, 0.95, 0.9, 0.85, 0.8, 0.75, 0.7, 0.65, 0.6, 0.55, and 0.5 mm (e.g., about 0.35-0.9 mm, about 0.15-0.8 mm, etc.).

According to certain embodiments of the invention, for instance, the meltblown layer may comprise a basis weight from about 1 gsm to about 20 gsm. In some embodiments of the invention, for example, the meltblown layer may comprise a basis weight from about 2 gsm to about 15 gsm. In other embodiments of the invention, for instance, the meltblown layer may comprise a basis weight from about 3 gsm to about 10 gsm. In certain embodiments of the invention, for example, the meltblown layer may comprise a basis weight from about 4 gsm to about 6 gsm. In further embodiments of the invention, for instance, the meltblown layer may comprise a basis weight of about 5 gsm. As such, in certain embodiments of the invention, the meltblown layer may comprise a basis weight from at least about any of the following: 1, 2, 3, 4, and 5 gsm and/or at most about 20, 19, 18, 17, 16, 15, 14, 13, 12, 11, 10, 9, 8, 7, 6, and 5 gsm (e.g., about 2-12 gsm, about 4-18 gsm, etc.). Basis weight was measured in a way that is consistent with the ASTM test method D-3776.

In accordance with certain embodiments of the invention, for example, the weather resistive barrier may comprise a film laminated to a fibrous material, while in other embodiments of the invention the weather resistive barrier does not include a film (e.g., devoid of a film). In some embodiments of the invention, for instance, the fibrous material may comprise a woven material. In further embodiments of the invention, for example, the woven material may comprise a polypropylene or a polyethylene (or other polymeric material) woven material. In other embodiments of the invention, for instance, the fibrous material may comprise a nonwoven material. In such embodiments of the invention, for example, the nonwoven material may comprise a polypropylene or a polyethylene (or other polymeric material) nonwoven material. According to certain embodiments of the invention, for instance, the nonwoven material may comprise, for example, a spunbond layer. In other embodiments of the invention, for example, the nonwoven material may comprise a meltblown layer. Although the weather resistive barrier may comprise a fibrous material as described herein, the weather resistive material may be any suitable material as understood by one of ordinary skill in the art including, but not limited to, at least one of paper, tar paper, felt, roofing felt, a thermoplastic material, a synthetic resin, an olefin resin, a polyolefin polymer, polypropylene (as already discussed), a high density polyethylene, a polystyrene, a nylon, a polyvinyl chloride (PVC) and/or the like. In some embodiments of the invention, for instance, the weather resistive barrier may comprise from greater than 60% (e.g., about 60% to about 99%) by weight of a polypropylene.

According to certain embodiments of the invention, for example, weather resistive barriers that include a film may comprise a breathable polyolefin film. The breathable polyolefin film, for instance, may comprise a microporous film or a monolithic film. In further embodiments of the invention, for example, the film may comprise less than 40% (e.g., from about 1% to about 40%) by weight of the weather resistive barrier. Moreover, according to certain embodiments of the invention, for example, the breathable polyolefin film may further comprise calcium carbonate (i.e. a filler). As noted above, certain embodiments of the invention include a weather resistive barrier that may be devoid of any film layer, such as Tyvek® which utilizes fine high-density polyethylene (HDPE) spun fibers that are fused together to form a uniform web having numerous extremely small pores that resist bulk water and air penetration, while allowing moisture vapor to pass.

According to certain embodiments of the invention, for instance, at least one of the fibrous material and/or the film of the weather resistive barrier may further comprise a UV stabilizer additive. In such embodiments of the invention, for example, the weather resistive barrier may comprise less than 3% (e.g., from about 0.1% to about 3%) by weight of the UV stabilizer additive.

In some embodiments of the invention, for instance, the weather resistive barrier may further comprise a pigment, said pigment may comprise, by way of example only, carbon black and titanium dioxide. For instance, the pigment may be selected to provide any final color of choice (e.g., blue, green, etc.). In such embodiments of the invention, for example, the weather resistive barrier may comprise less than 2% (e.g., from about 0.1% to about 2%) by weight of the pigment. In some embodiments of the invention, for instance, the pigment may comprise less than 10% (e.g., from about 0.1% to about 10%) by weight of carbon black and less than 1% (e.g., from about 0.1% to about 1%) by weight of titanium dioxide.

According to certain embodiments of the invention, for instance, the weather resistive barrier may comprise a basis weight from about 5 gsm to about 250 gsm (e.g., 50 gsm to about 150 gsm). In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. In certain embodiments of the invention, for example, the weather resistive barrier may comprise a basis weight of 94.94 gsm. As such, in certain embodiments of the invention, the weather resistive barrier may comprise a basis weight from at least about any of the following: 5, 10, 20, 30, 40, 50, 55, 60, 65, 70, 75, 80, 85, 90, 91, 92, 93, and 94 gsm and/or at most about 250, 225, 200, 175, 150, 140, 130, 120, 110, 100, 99, 98, 97, 96, and 95 gsm (e.g., about 60-96 gsm, about 90-100 gsm, etc.). Basis weight was measured in a way that is consistent with the ASTM test method D-3776.

According to certain embodiments of the invention, for example, the weather resistive barrier may comprise a thickness from about 1 mil to about 50 mils (e.g., about 5 mils to about 20 mils. In some embodiments of the invention, for instance, the weather resistive barrier may comprise a thickness from about 10 mils to about 15 mils. In further embodiments of the invention, for example, the weather resistive barrier may comprise a thickness from about 12 mils to about 13 mils. As such, in certain embodiments of the invention, the weather resistive barrier may comprise a thickness from at least about any of the following: 1, 2, 3, 4, 5, 6, 7, 8, 9, 10, 11, and 12 mils and/or at most about 50, 40, 30, 20, 19, 18, 17, 16, 15, 14, and 13 mils (e.g., 7-14 mils, about 10-19 mils, about 3-40 mils, etc.). Thickness was measured in a way that is consistent with the ASTM test method D-1777.

According to certain embodiments of the invention, for instance, the weather resistive barrier may comprise a bursting strength from about 20 psi to about 200 psi (e.g., about 50 psi to about 100 psi). In some embodiments of the invention, for example, the weather resistive barrier may comprise a bursting strength from about 55 psi to about 75 psi. In further embodiments of the invention, for instance, the weather resistive barrier may comprise a bursting strength from about 60 psi to about 70 psi. In other embodiments of the invention, for example, the weather resistive barrier may comprise a bursting strength of about 66 psi. As such, in certain embodiments of the invention, the weather resistive barrier may comprise a bursting strength from at least about any of the following: 20, 25, 30, 40, 50, 51, 52, 53, 54, 55, 56, 57, 58, 59, 60, 61, 62, 63, 64, 65, and 66 psi and/or at most about 200, 175, 150, 125, 100, 95, 90, 85, 80, 75, 70, 69, 68, 67, and 66 psi (e.g., about 56-80 psi, about 62-100 psi, etc.). Bursting strength was measured in a way that is consistent with the ASTM test method D-3786.

According to certain embodiments of the invention, for example, the weather resistive barrier may comprise a dry tensile strength of 80/87 (i.e. 80 lbs md, 87 lbs xd) as measured by the ASTM test method D-5034. In certain embodiments of the invention, for instance, the weather resistive barrier may comprise a trapezoidal tear strength of about 30/33 (i.e. 30 lbs md, 33 lbs xd) as measured by the ASTM test methods D-1117 and D-5733.

According to certain embodiments of the invention, for example, the weather resistive barrier may comprise a hydrostatic pressure resistance from about 500 cm to about 2000 cm (e.g., 800 cm to about 1000 cm). In other embodiments of the invention, for instance, the weather resistive barrier may comprise a hydrostatic pressure resistance from about 825 cm to about 900 cm. In further embodiments of the invention, for example, the weather resistive barrier may comprise a hydrostatic pressure resistance from about 850 cm to about 875 cm. In certain embodiments of the invention, for instance, the weather resistive barrier may comprise a hydrostatic pressure resistance from about 860 cm to about 870 cm. In some embodiments of the invention, for example, the weather resistive barrier may comprise a hydrostatic pressure resistance of about 865 cm. As such, in certain embodiments of the invention, the weather resistive barrier may comprise a hydrostatic pressure resistive from at least about any of the following: 250, 500, 600, 700, 800, 805, 810, 815, 820, 825, 830, 835, 840, 845, 850, 855, 860, and 865 cm and/or at most about 2000, 1750, 1500, 1250, 1000, 975, 950, 925, 900, 895, 890, 885, 880, 875, 870, and 865 cm (e.g., about 815-900 cm, about 830-875 cm, about 250-1750 cm, etc.). Hydrostatic pressure resistance was measured in a way that is consistent with the AATCC 127-1995 test method.

Moreover, according to certain embodiments of the invention, for instance, the weather resistive barrier may comprise a Gurley Hill Porosity from about 2500 s/100 cc to about 5000 s/100 cc. Gurley Hill Porosity was measured in a way that is consistent with the TAPPI T-460 test method.

In accordance with certain embodiments of the invention, for example, the weather resistive barrier may comprise a moisture vapor transmission rate (MVTR) from about 1 US perms to about 75 US perms (e.g., about 5 US perms to about 30 US perms). In some embodiments of the invention, for instance, the weather resistive barrier may comprise an MVTR from about 7 US perms to about 20 US perms. In other embodiments of the invention, for example, the weather resistive barrier may comprise an MVTR from about 10 US perms to about 15 US perms. In further embodiments of the invention, for instance, the weather resistive barrier may comprise an MVTR from about 11 US perms to about 12 US perms. As such, in certain embodiments of the invention, the weather resistive barrier may comprise an MVTR from at least about any of the following: 1, 3, 5, 6, 7, 8, 9, 10, 11, 12, 15, and 20 US perms and/or at most about 75, 70, 60, 50, 40, 30, 25, 20, 19, 18, 17, 16, 15, 14, 13, and 12 US perms (e.g., about 7-19 US perms, about 10-30 US perms, etc.). MVTR was measured in a way that is consistent with the ASTM test method E-96-95 procedure A.

According to certain embodiments of the invention, for example, the weather resistive barrier may comprise an UV light exposure resistance from about 4 months to about 12 months. In some embodiments of the invention, for instance, the weather resistive barrier may comprise a UV light exposure resistance from about 5 months to about 7 months. In other embodiments of the invention, for example, the weather resistive barrier may comprise a UV light exposure resistance of about 6 months. As such, in certain embodiments of the invention, the weather resistive barrier may comprise a UV light exposure resistance from at least about any of the following: 4, 5, and 6 months and/or at most about 12, 11, 10, 9, 8, 7, and 6 months (e.g., about 4-10 months, about 6-12 months, etc.).

In certain embodiments of the invention, for instance, the weather resistive barrier may comprise an air leakage from about 0.001 L(S·M$^2$) to 0.01 L(S·M$^2$) at 75 pascals (e.g., about 0.001 L(S·M$^2$) to 0.005 L(S·M$^2$) at 75 pascals). In some embodiments of the invention, for example, the weather resistive barrier may comprise an air leakage from about 0.002 L(S·M$^2$) to 0.004 L(S·M$^2$) at 75 pascals. In further embodiments of the invention, for instance, the weather resistive barrier may comprise an air leakage from about 0.0025 L(S·M$^2$) to 0.0035 L(S·M$^2$) at 75 pascals. As such, in certain embodiments of the invention, the weather resistive barrier may comprise an air leakage at 75 pascals from at least about any of the following: 0.001, 0.0015, 0.002, 0.0025, 0.003, and 0.0035 L(S·M$^2$) and/or at most about 0.01, 0.0075, 0.005, 0.0045, 0.004, and 0.0035 L(S·M$^2$) (e.g., about 0.002-0.0045 L(S·M$^2$), about 0.001-0.004 L(S·M$^2$), etc.). Air leakage was measured in a way that is consistent with the CCMC Technical Guide MF-07273 test method.

III. Building Assembly

In another aspect, certain embodiments of the invention provide a building assembly. According to an embodiment of the invention, the building assembly includes an inner sheathing member, an exterior building material, and a drainage promoting fabric positioned between the inner sheathing member and the exterior building material. In some embodiments of the invention, for example, the drainage promoting fabric may include a weather resistive barrier having an outer surface, and a three-dimensional, non-uniform or non-continuous meltblown layer positioned on the outer surface of the weather resistive barrier. The meltblown layer, for instance, may comprise meltblown shot, meltblown ropes, or both.

Figure 3:
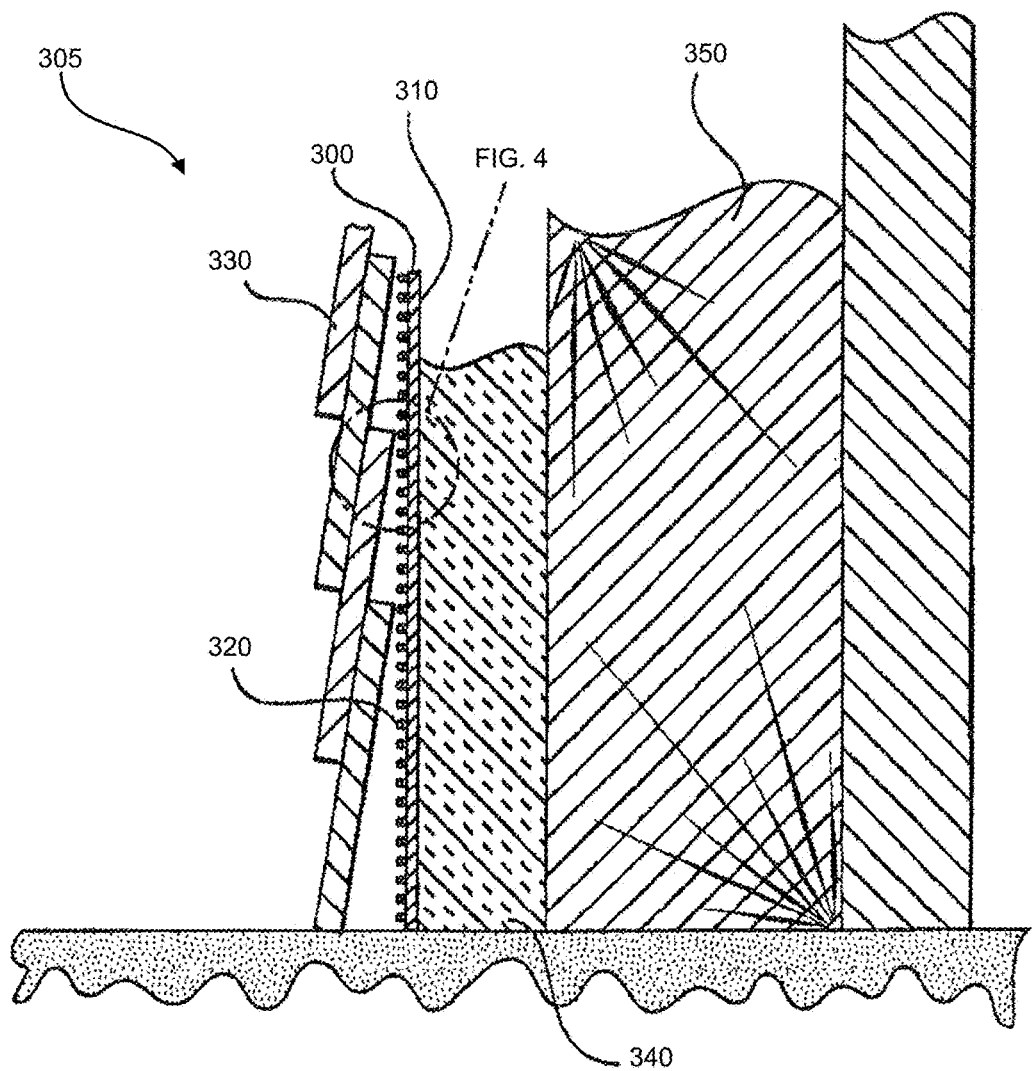
FIG. 3 illustrates a cut-away side view of a building assembly according to an embodiment of the invention.

FIG. 3, for example, illustrates a cut-away side view of a building assembly according to an embodiment of the invention. As shown in FIG. 3, for instance, the building assembly 305 includes inner sheathing members 340 affixed to support posts 350. In some embodiments of the invention, for example, the inner sheathing members 340 may be formed of panels of plywood, oriented strand board, particle board, insulated concrete, or any other materials permitted by local building codes. During construction of the building assembly 305, the drainage promoting fabric 300 may be unrolled on, and secured to, the inner sheathing members 340 such that the weather resistive barrier 310 completely covers the inner sheathing members 340 and such that the meltblown ropes and/or meltblown shot 320 face away from the inner sheathing members 340. In some embodiments of the invention, for instance, the drainage promoting fabric 300 may be secured to the inner sheathing members 340 with staples or the like and extends horizontally or vertically within the building assembly 305. Several slightly-overlapping, horizontally or vertically-extending rows of the drainage promoting fabric 300 may be required to cover the entire elevation of the building assembly 305. In this regard, the continuous ventilation paths P formed by the meltblown ropes and/or meltblown shot 320 may permit moisture to drain downwardly within the building assembly 305 along the meltblown ropes and/or meltblown shot 320. An exterior building material 330 may be affixed on the outer side of the building assembly 305 such that it overlies the drainage promoting fabric 300 and sandwiches the drainage promoting fabric 300 between the inner sheathing member 340 and the exterior building material 330. In some embodiments of the invention, for example, the exterior building material 330 may be a wood or fiber-cement siding product or wooden shingles such as cedar shakes. The exterior building material 330 may also be brick, stone, stucco, exterior insulation finish systems (EIFS), vinyl, metal, asphalt, rubber, thermoplastic, and other suitable exterior siding and roofing materials. In this regard, the building assembly 305 may be an exterior wall of a building, an exterior roof of a building and/or the like.

Figure 4:
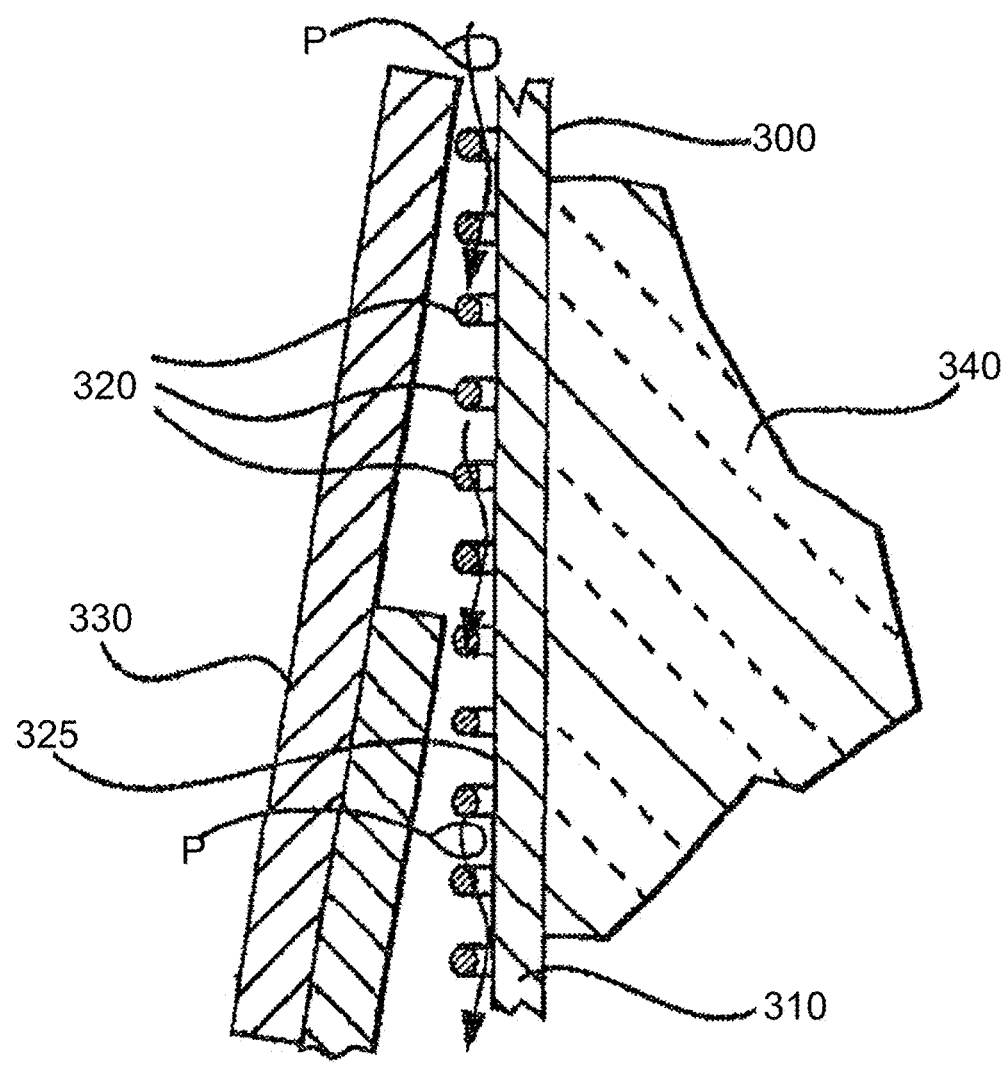
FIG. 4 illustrates a portion of the building assembly illustrated in FIG. 3 according to an embodiment of the invention.

FIG. 4, for instance, illustrates a portion of the building assembly illustrated in FIG. 3 according to an embodiment of the invention. As shown in FIG. 4, for example, the meltblown ropes and/or meltblown shot 320 may be irregularly spaced on the weather resistive barrier 310 such that continuous air gaps 325 may be formed between the exterior building material and the weather resistive barrier 310. In this regard, the continuous air gaps 325 may provide drainage and ventilation paths P within the building assembly 305. Any moisture which collects within the building assembly 305 may be provided with a path to drain downwardly under the force of gravity and out of the building assembly 305. The plurality of continuous air gaps 325 dispersed throughout the building assembly 305 may also enable the circulation of air between the inner sheathing members 340 and the exterior building material 330 to aid in drying or evaporating any moisture present within the building assembly 305.

In accordance with certain embodiments of the invention, for instance, the drainage promoting fabric may comprise a drainage efficiency from about 75% to about 100% (e.g., about 90% to about 100%). In some embodiments of the invention, for example, the drainage promoting fabric may comprise a drainage efficiency from about 92% to about 98%. In other embodiments of the invention, for instance, the drainage promoting fabric may comprise a drainage efficiency from about 94% to about 96%. In further embodiments of the invention, for example, the drainage promoting fabric may comprise a drainage efficiency of about 95%. As such, in certain embodiments of the invention, the drainage promoting fabric may comprise a drainage efficiency of at least about any of the following: 70, 75, 80, 85, 90, 91, 92, 93, 94, and 95% and/or at most about 100, 99, 98, 97, 96, 95, 90, and 85% (e.g., about 75-99%, about 80-90%, etc.). Drainage efficiency was tested in a way that is consistent with the ASTM test method E-2273.

According to certain embodiments of the invention, for instance, the drainage promoting fabric may comprise a width from about 3 feet to about 10 feet. As such, in certain embodiments of the invention, the drainage promoting fabric may comprise a width from at least about any of the following: 3, 4, 5, 6, 7, 8, 9, and 10 feet and/or at most about 10 feet (e.g., about 7-10 feet, about 3-9 feet, etc.). However, the drainage promoting fabric may comprise any suitable width to be used, for example, as housewrap. Moreover, the drainage promoting fabric may comprise a length longer and/or greater than the width. For instance, the drainage promoting fabric may comprise a length from about 95 feet to about 200 feet. As such, in certain embodiments of the invention, the drainage promoting fabric may comprise a length from at least about any of the following: 95, 100, 105, 110, 115, 120, 125, 130, 135, 140, 145, 150, 155, 160, 165, 170, 175, 180, 185, 190, 195, and 200 feet and/or at most about 200 feet (e.g., about 145-195 feet, about 95-175 feet, etc.). However, the drainage promoting fabric may comprise any suitable length to be used, for instance, as housewrap.

In accordance with certain embodiments of the invention, for example, the meltblown layer may comprise at least one of a polypropylene, an ethylene-propylene impact copolymer blend, or any combination thereof. In some embodiments of the invention, for instance, the meltblown layer may comprise an ethylene-propylene impact copolymer. In other embodiments of the invention, for instance, the meltblown layer may comprise at least one thermoplastic polymer suitable for fiber formation in a meltblown process as understood by one of ordinary skill in the art. For example, the meltblown layer may comprise at least one of a polyolefin, a polyester, a polypropylene, a high density polypropylene, a polyvinyl chloride, a vinylidene chloride, a polytetrafluoroethylene, a polyetherester, a nylon, a polyamide, a polycarbonate, a poly(methyl) acrylate, a polyoxymethylene, a polystyrene, a polycaprolactam, an acrylonitrile butadiene styrene, a thermoplastic starch, a polyvinyl alcohol, a polylactic acid, a polyphenylsulfide, a poly-ether-ether-ketone, a polyvinylidene, a polyurethane, a polyurea and/or the like. In accordance with certain embodiments of the invention, the meltblown layer may comprise a polyethylene, such as a low-density polyethylene and high-density polyethylene. In further embodiments of the invention, for instance, the meltblown layer may comprise at least one of a thermosetting polymer, a photocurable polymer and/or the like. In certain embodiments of the invention, for example, the meltblown layer may comprise bicomponent or multicomponent fibers. According to certain embodiments of the invention, for example, the meltblown layer further comprises at least one of an anti-microbial additive, an anti-fungal additive, an ultraviolet (UV) stabilizer additive, or any combination thereof.

In some embodiments of the invention, for instance, the meltblown shot may comprise irregularly shaped fibers, wads, or particles. In further embodiments of the invention, for example, the meltblown shot may be randomly and irregularly distributed throughout the meltblown layer, which may be positioned on the outer surface of the weather resistive barrier.

According to certain embodiments of the invention, for instance, the meltblown layer may comprise an average shot height, rope height, or both (i.e. extending in the Z-direction) from about 0.1 mm to about 1.0 mm. In some embodiments of the invention, for example, the meltblown layer may comprise an average shot height, rope height, or both from about 0.25 mm to about 0.75 mm. In other embodiments of the invention, for instance, the meltblown layer may comprise an average shot height, rope height, or both from about 0.4 mm to about 0.6 mm. In further embodiments of the invention, for example, the meltblown layer may comprise an average shot height, rope height, or both of about 0.5 mm. As such, in certain embodiments of the invention, the meltblown layer may comprise an average shot height, rope height, or both from at least about any of the following: 0.1, 0.15, 0.2, 0.25, 0.3, 0.35, 0.4, 0.45, and 0.5 mm and/or at most about 1.0, 0.95, 0.9, 0.85, 0.8, 0.75, 0.7, 0.65, 0.6, 0.55, and 0.5 mm (e.g., about 0.35-0.9 mm, about 0.15-0.8 mm, etc.).

In some embodiments of the invention, for instance, the meltblown ropes and/or meltblown shot, the meltblown rope, or a combination thereof may define a continuous air gap between the weather resistive barrier and the exterior building material. In such embodiments of the invention, for example, the continuous air gap may comprise a height corresponding to the average shot height, rope height, or both. In this regard, the meltblown ropes and/or meltblown shot may provide a multidirectional drainage path running via the continuous air gaps positioned between them.

According to certain embodiments of the invention, for instance, the meltblown layer may comprise a basis weight from about 1 gsm to about 20 gsm. In some embodiments of the invention, for example, the meltblown layer may comprise a basis weight from about 2 gsm to about 15 gsm. In other embodiments of the invention, for instance, the meltblown layer may comprise a basis weight from about 3 gsm to about 10 gsm. In certain embodiments of the invention, for example, the meltblown layer may comprise a basis weight from about 4 gsm to about 6 gsm. In further embodiments of the invention, for instance, the meltblown layer may comprise a basis weight of about 5 gsm. As such, in certain embodiments of the invention, the meltblown layer may comprise a basis weight from at least about any of the following: 1, 2, 3, 4, and 5 gsm and/or at most about 20, 19, 18, 17, 16, 15, 14, 13, 12, 11, 10, 9, 8, 7, 6, and 5 gsm (e.g., about 2-12 gsm, about 4-18 gsm, etc.).

In accordance with certain embodiments of the invention, for example, the weather resistive barrier may comprise a film laminated to a fibrous material, while in other embodiments of the invention the weather resistive barrier does not include a film (e.g., devoid of a film). In some embodiments of the invention, for instance, the fibrous material may comprise a woven material. In further embodiments of the invention, for example, the woven material may comprise a polypropylene or a polyethylene (or other polymeric material) woven material. In other embodiments of the invention, for instance, the fibrous material may comprise a nonwoven material. In such embodiments of the invention, for example, the nonwoven material may comprise a polypropylene or a polyethylene (or other polymeric material) nonwoven material. According to certain embodiments of the invention, for instance, the nonwoven material may comprise, for example, a spunbond layer. In other embodiments of the invention, for example, the nonwoven material may comprise a meltblown layer. Although the weather resistive barrier may comprise a fibrous material as described herein, the weather resistive material may be any suitable material as understood by one of ordinary skill in the art including, but not limited to, at least one of paper, tar paper, felt, roofing felt, a thermoplastic material, a synthetic resin, an olefin resin, a polyolefin polymer, polypropylene (as already discussed), a high density polyethylene, a polystyrene, a nylon, a polyvinyl chloride (PVC) and/or the like. In some embodiments of the invention, for instance, the weather resistive barrier may comprise from greater than 60% (e.g., about 60% to about 99%) by weight of a polypropylene.

According to certain embodiments of the invention, for example, weather resistive barriers that include a film may comprise a breathable polyolefin film. The breathable polyolefin film, for instance, may comprise a microporous film or a monolithic film. In further embodiments of the invention, for example, the film may comprise less than 40% (e.g., from about 1% to about 40%) by weight of the weather resistive barrier. Moreover, according to certain embodiments of the invention, for example, the breathable polyolefin film may further comprise calcium carbonate (i.e. a filler). As noted above, certain embodiments of the invention include a weather resistive barrier that may be devoid of any film layer, such as Tyvek® which utilizes fine high-density polyethylene (HDPE) spun fibers that are fused together to form a uniform web having numerous extremely small pores that resist bulk water and air penetration, while allowing moisture vapor to pass.

According to certain embodiments of the invention, for instance, at least one of the fibrous material and/or the film of the weather resistive barrier may further comprise a UV stabilizer additive. In such embodiments of the invention, for example, the weather resistive barrier may comprise from about 0.1% to about 3% by weight of the UV stabilizer additive.

In some embodiments of the invention, for instance, the weather resistive barrier may further comprise a pigment, said pigment may comprise, by way of example only, carbon black and titanium dioxide. For instance, the pigment may be selected to provide any final color of choice (e.g., blue, green, etc.). In such embodiments of the invention, for example, the weather resistive barrier may comprise less than 2% (e.g., from about 0.1% to about 2%) by weight of the pigment. In some embodiments of the invention, for instance, the pigment may comprise less than 10% (e.g., from about 0.1% to about 10%) by weight of carbon black and less than 1% (e.g., from about 0.1% to about 1%) by weight of titanium dioxide.

According to certain embodiments of the invention, for instance, the weather resistive barrier may comprise a basis weight from about 5 gsm to about 250 gsm (e.g., 50 gsm to about 150 gsm). In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. In certain embodiments of the invention, for example, the weather resistive barrier may comprise a basis weight of 94.94 gsm. As such, in certain embodiments of the invention, the weather resistive barrier may comprise a basis weight from at least about any of the following: 5, 10, 20, 30, 40, 50, 55, 60, 65, 70, 75, 80, 85, 90, 91, 92, 93, and 94 gsm and/or at most about 250, 225, 200, 175, 150, 140, 130, 120, 110, 100, 99, 98, 97, 96, and 95 gsm (e.g., about 60-96 gsm, about 90-100 gsm, etc.). Basis weight was measured in a way that is consistent with the ASTM test method D-3776.

According to certain embodiments of the invention, for example, the weather resistive barrier may comprise a thickness from about 1 mil to about 50 mils (e.g., about 5 mils to about 20 mils. In some embodiments of the invention, for instance, the weather resistive barrier may comprise a thickness from about 10 mils to about 15 mils. In further embodiments of the invention, for example, the weather resistive barrier may comprise a thickness from about 12 mils to about 13 mils. As such, in certain embodiments of the invention, the weather resistive barrier may comprise a thickness from at least about any of the following: 1, 2, 3, 4, 5, 6, 7, 8, 9, 10, 11, and 12 mils and/or at most about 50, 40, 30, 20, 19, 18, 17, 16, 15, 14, and 13 mils (e.g., 7-14 mils, about 10-19 mils, about 3-40 mils, etc.). Thickness was measured in a way that is consistent with the ASTM test method D-1777.

According to certain embodiments of the invention, for instance, the weather resistive barrier may comprise a bursting strength from about 20 psi to about 200 psi (e.g., about 50 psi to about 100 psi). In some embodiments of the invention, for example, the weather resistive barrier may comprise a bursting strength from about 55 psi to about 75 psi. In further embodiments of the invention, for instance, the weather resistive barrier may comprise a bursting strength from about 60 psi to about 70 psi. In other embodiments of the invention, for example, the weather resistive barrier may comprise a bursting strength of about 66 psi. As such, in certain embodiments of the invention, the weather resistive barrier may comprise a bursting strength from at least about any of the following: 20, 25, 30, 40, 50, 51, 52, 53, 54, 55, 56, 57, 58, 59, 60, 61, 62, 63, 64, 65, and 66 psi and/or at most about 200, 175, 150, 125, 100, 95, 90, 85, 80, 75, 70, 69, 68, 67, and 66 psi (e.g., about 56-80 psi, about 62-100 psi, etc.). Bursting strength was measured in a way that is consistent with the ASTM test method D-3786.

According to certain embodiments of the invention, for example, the weather resistive barrier may comprise a dry tensile strength of 80/87 (i.e. 80 lbs md, 87 lbs xd) as tested by ASTM D-5034. In certain embodiments of the invention, for instance, the weather resistive barrier may comprise a trapezoidal tear strength of about 30/33 (i.e. 30 lbs md, 33 lbs xd) as tested by ASTM D-5733-9.

According to certain embodiments of the invention, for example, the weather resistive barrier may comprise a hydrostatic pressure resistance from about 500 cm to about 2000 cm (e.g., 800 cm to about 1000 cm). In other embodiments of the invention, for instance, the weather resistive barrier may comprise a hydrostatic pressure resistance from about 825 cm to about 900 cm. In further embodiments of the invention, for example, the weather resistive barrier may comprise a hydrostatic pressure resistance from about 850 cm to about 875 cm. In certain embodiments of the invention, for instance, the weather resistive barrier may comprise a hydrostatic pressure resistance from about 860 cm to about 870 cm. In some embodiments of the invention, for example, the weather resistive barrier may comprise a hydrostatic pressure resistance of about 865 cm. As such, in certain embodiments of the invention, the weather resistive barrier may comprise a hydrostatic pressure resistive from at least about any of the following: 250, 500, 600, 700, 800, 805, 810, 815, 820, 825, 830, 835, 840, 845, 850, 855, 860, and 865 cm and/or at most about 2000, 1750, 1500, 1250, 1000, 975, 950, 925, 900, 895, 890, 885, 880, 875, 870, and 865 cm (e.g., about 815-900 cm, about 830-875 cm, about 250-1750 cm, etc.). Hydrostatic pressure resistance was measured in a way that is consistent with the AATCC 127-1995 test method.

Moreover, according to certain embodiments of the invention, for instance, the weather resistive barrier may comprise a Gurley Hill Porosity from about 2500 s/100 cc to about 5000 s/100 cc. Gurley Hill Porosity was measured in a way that is consistent with the TAPPI T-460 test method.

In accordance with certain embodiments of the invention, for example, the weather resistive barrier may comprise a moisture vapor transmission rate (MVTR) from about 1 US perms to about 75 US perms (e.g., about 5 US perms to about 30 US perms). In some embodiments of the invention, for instance, the weather resistive barrier may comprise an MVTR from about 7 US perms to about 20 US perms. In other embodiments of the invention, for example, the weather resistive barrier may comprise an MVTR from about 10 US perms to about 15 US perms. In further embodiments of the invention, for instance, the weather resistive barrier may comprise an MVTR from about 11 US perms to about 12 US perms. As such, in certain embodiments of the invention, the weather resistive barrier may comprise an MVTR from at least about any of the following: 1, 3, 5, 6, 7, 8, 9, 10, 11, 12, 15, and 20 US perms and/or at most about 75, 70, 60, 50, 40, 30, 25, 20, 19, 18, 17, 16, 15, 14, 13, and 12 US perms (e.g., about 7-19 US perms, about 10-30 US perms, etc.). MVTR was measured in a way that is consistent with the ASTM test method E-96-95 procedure A.

According to certain embodiments of the invention, for example, the weather resistive barrier may comprise an UV light exposure resistance from about 4 months to about 12 months. In some embodiments of the invention, for instance, the weather resistive barrier may comprise a UV light exposure resistance from about 5 months to about 7 months. In other embodiments of the invention, for example, the weather resistive barrier may comprise a UV light exposure resistance of about 6 months. As such, in certain embodiments of the invention, the weather resistive barrier may comprise a UV light exposure resistance from at least about any of the following: 4, 5, and 6 months and/or at most about 12, 11, 10, 9, 8, 7, and 6 months (e.g., about 4-10 months, about 6-12 months, etc.).

In certain embodiments of the invention, for instance, the weather resistive barrier may comprise an air leakage from about 0.001 L(S·M$^2$) to 0.01 L(S·M$^2$) at 75 pascals (e.g., about 0.001 L(S·M$^2$) to 0.005 L(S·M$^2$) at 75 pascals). In some embodiments of the invention, for example, the weather resistive barrier may comprise an air leakage from about 0.002 L(S·M$^2$) to 0.004 L(S·M$^2$) at 75 pascals. In further embodiments of the invention, for instance, the weather resistive barrier may comprise an air leakage from about 0.0025 L(S·M$^2$) to 0.0035 L(S·M$^2$) at 75 pascals. As such, in certain embodiments of the invention, the weather resistive barrier may comprise an air leakage at 75 pascals from at least about any of the following: 0.001, 0.0015, 0.002, 0.0025, 0.003, and 0.0035 L(S·M$^2$) and/or at most about 0.01, 0.0075, 0.005, 0.0045, 0.004, and 0.0035 L(S·M$^2$) (e.g., about 0.002-0.0045 L(S·M$^2$), about 0.001-0.004 L(S·M$^2$), etc.). Air leakage was measured in a way that is consistent with the CCMC Technical Guide MF-07273 test method.

IV. Process for Forming a Drainage Promoting Fabric

In yet another aspect, a process for forming a drainage promoting fabric is provided. According to an embodiment of the invention, the process includes providing a weather resistive barrier, providing a three-dimensional, non-uniform or non-continuous meltblown layer, and attaching the meltblown layer to the weather resistive barrier. In such embodiments of the invention, for example, the meltblown layer may comprise meltblown shot, meltblown ropes, or both.

Figure 5:
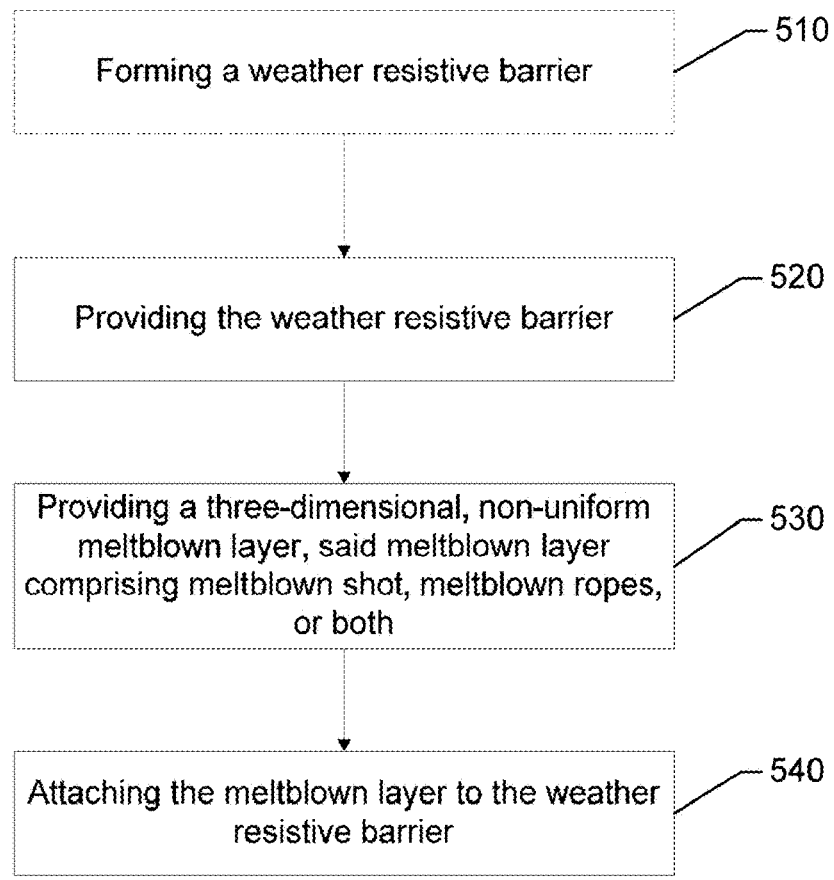
FIG. 5 illustrates a block diagram of a process for forming a drainage promoting fabric according to an embodiment of the invention.

FIG. 5, for instance, illustrates a block diagram of a process for forming a drainage promoting fabric according to an embodiment of the invention. As shown in FIG. 5, for example, the process may include an optional step of forming a weather resistive barrier at operation 510. The process may continue by providing the weather resistive barrier at operation 520, providing a three-dimensional, non-uniform or non-continuous meltblown layer, said meltblown layer comprising meltblown shot, meltblown ropes, or both at operation 530, and attaching the meltblown layer to the weather resistive barrier at operation 540.

According to certain embodiments of the invention, for instance, providing the three-dimensional, non-uniform or non-continuous meltblown layer (including the meltblown ropes and/or meltblown shot) may comprise adjusting the meltblowing air flow system (e.g., by increasing the air flow area or otherwise decreasing the velocity of the air stream immediately adjacent the molten polymeric strands as they emerge from the meltblown die head) in order to increase fiber coarseness. In addition, the airflow near the die exit may be used to agitate and spread the polymeric fibers in a manner that may be highly non-uniform and/or non-continuous on the forming conveyor belt, rotating drum and/or the like. The large degree of non-uniformity and/or non-continuity of the lay-down of coarse meltblown fibers may be manifest in a meltblown layer which may display variations in thickness and variations in basis weight across the surface of the meltblown layer. In this regard, the meltblown layer may exhibit an uneven surface including meltblown ropes and/or meltblown shot.

In some embodiments of the invention, for instance, attaching the meltblown layer to the weather resistive barrier may comprise meltspinning the meltblown layer (e.g., a non-continuous or an non-uniform meltblown layer) directly onto the weather resistive barrier. In this regard, the polymeric material of the meltblown layer and the weather resistive barrier may engage, melt, and then solidify together to fuse the meltblown layer to the weather resistive barrier via the application of heat and/or pressure. As such, no adhesive may be required, and a strong bond may be formed.

In other embodiments of the invention, for example, attaching the meltblown layer to the weather resistive barrier may comprise preparing the meltblown layer separately from the weather resistive barrier, and attaching the prepared meltblown layer to the weather resistive barrier. In such embodiments of the invention, for instance, preparing the meltblown layer separately from the weather resistive barrier may comprise extruding the meltblown layer onto a surface such as a traveling conveyor, rotating drum and/or the like. Moreover, attaching the prepared meltblown layer to the weather resistive barrier may comprise, for example, at least one of thermal bonding, adhesive bonding (e.g., via hot melt adhesive, curing adhesive and/or the like), sonic bonding, mechanical bonding (e.g., needling, crimping and/or the like), or any combination thereof. When thermal bonding is used, for example, the prepared meltblown layer and the weather resistive barrier may be heated together such that the polymeric material of the meltblown layer and the weather resistive barrier may engage, melt, and then solidify together to fuse the meltblown layer to the weather resistive barrier via the application of heat and/or pressure. As such, no adhesive may be required, and a strong bond may be formed. Heat may be applied to the meltblown layer and the weather resistive barrier before they are positioned together, after they are positioned together, or both.

In this regard, the meltblown layer may be meltspun onto the surface of a traveling conveyor, a rotating drum and/or the like. Next, at a downstream location an indefinite length web of the weather resistive barrier may be unrolled into engagement with the surface of the conveyor or drum such that the outer surface of the weather resistive barrier engages the meltblown layer. A roller or the like press may be used to apply pressure to the weather resistive barrier to engage the surface of the traveling conveyor or drum and the meltblown layer to cause the meltblown layer to bond to the weather resistive barrier.

Figure 6:
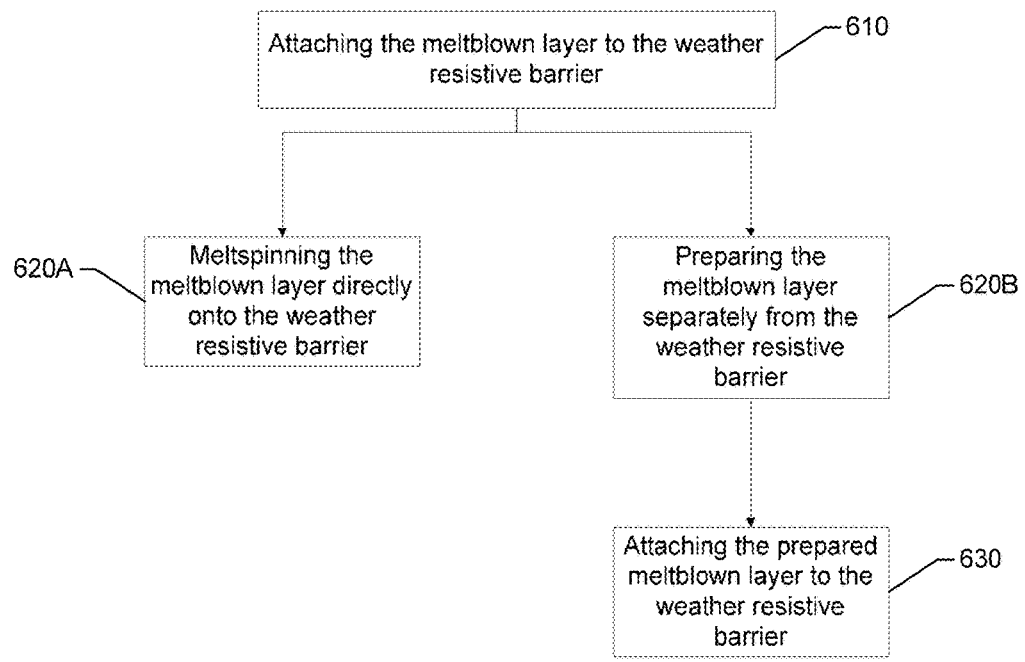
FIG. 6 illustrates a block diagram of a process for attaching a meltblown layer to a weather resistive barrier according to an embodiment of the invention.

FIG. 6, for example, illustrates a block diagram of a process for attaching a meltblown layer to a weather resistive barrier according to an embodiment of the invention. As shown in FIG. 6, for instance, attaching the meltblown layer to the weather resistive barrier at operation 610 may comprise either meltspinning the meltblown layer directly onto the weather resistive barrier at operation 620A or preparing the meltblown layer separately from the weather resistive barrier at operation 620B. If the meltblown layer is prepared separately from the weather resistive barrier as at operation 620B, then the process may continue by attaching the prepared meltblown layer to the weather resistive barrier at operation 630.

In further embodiments of the invention, for example, the process may further comprise forming the weather resistive barrier. In such embodiments of the invention, for instance, forming the weather resistive barrier may comprise forming a nonwoven, non-perforated fabric via spunbonding, and applying a microporous or monolithic film to an outer surface of the fabric to form a weather resistive barrier.

In accordance with certain embodiments of the invention, for instance, the drainage promoting fabric may comprise a drainage efficiency from about 75% to about 100% (e.g., about 90% to about 100%). In some embodiments of the invention, for example, the drainage promoting fabric may comprise a drainage efficiency from about 92% to about 98%. In other embodiments of the invention, for instance, the drainage promoting fabric may comprise a drainage efficiency from about 94% to about 96%. In further embodiments of the invention, for example, the drainage promoting fabric may comprise a drainage efficiency of about 95%. As such, in certain embodiments of the invention, the drainage promoting fabric may comprise a drainage efficiency of at least about any of the following: 70, 75, 80, 85, 90, 91, 92, 93, 94, and 95% and/or at most about 100, 99, 98, 97, 96, 95, 90, and 85% (e.g., about 75-99%, about 80-90%, etc.). Drainage efficiency was tested in a way that is consistent with the ASTM test method E-2273.

According to certain embodiments of the invention, for instance, the drainage promoting fabric may comprise a width from about 3 feet to about 10 feet. As such, in certain embodiments of the invention, the drainage promoting fabric may comprise a width from at least about any of the following: 3, 4, 5, 6, 7, 8, 9, and 10 feet and/or at most about 10 feet (e.g., about 7-10 feet, about 3-9 feet, etc.). However, the drainage promoting fabric may comprise any suitable width to be used, for example, as housewrap. Moreover, the drainage promoting fabric may comprise a length longer and/or greater than the width. For instance, the drainage promoting fabric may comprise a length from about 95 feet to about 200 feet. As such, in certain embodiments of the invention, the drainage promoting fabric may comprise a length from at least about any of the following: 95, 100, 105, 110, 115, 120, 125, 130, 135, 140, 145, 150, 155, 160, 165, 170, 175, 180, 185, 190, 195, and 200 feet and/or at most about 200 feet (e.g., about 145-195 feet, about 95-175 feet, etc.). However, the drainage promoting fabric may comprise any suitable length to be used, for instance, as housewrap.

In accordance with certain embodiments of the invention, for example, the meltblown layer may comprise at least one of a polypropylene, an ethylene-propylene impact copolymer blend, or any combination thereof. In some embodiments of the invention, for instance, the meltblown layer may comprise an ethylene-propylene impact copolymer. In other embodiments of the invention, for instance, the meltblown layer may comprise at least one thermoplastic polymer suitable for fiber formation in a meltblown process as understood by one of ordinary skill in the art. For example, the meltblown layer may comprise at least one of a polyolefin, a polyester, a polypropylene, a high density polypropylene, a polyvinyl chloride, a vinylidene chloride, a polytetrafluoroethylene, a polyetherester, a nylon, a polyamide, a polycarbonate, a poly(methyl) acrylate, a polyoxymethylene, a polystyrene, a polycaprolactam, an acrylonitrile butadiene styrene, a thermoplastic starch, a polyvinyl alcohol, a polylactic acid, a polyphenylsulfide, a poly-ether-ether-ketone, a polyvinylidene, a polyurethane, a polyurea and/or the like. In accordance with certain embodiments of the invention, the meltblown layer may comprise a polyethylene, such as a low-density polyethylene and high-density polyethylene. In further embodiments of the invention, for instance, the meltblown layer may comprise at least one of a thermosetting polymer, a photocurable polymer and/or the like. In certain embodiments of the invention, for example, the meltblown layer may comprise bicomponent or multicomponent fibers. According to certain embodiments of the invention, for example, the meltblown layer further comprises at least one of an anti-microbial additive, an anti-fungal additive, an ultraviolet (UV) stabilizer additive, or any combination thereof.

In some embodiments of the invention, for instance, the meltblown shot may comprise irregularly shaped fibers, wads, or particles. In further embodiments of the invention, for example, the meltblown shot may be randomly and irregularly distributed throughout the meltblown layer, which may be positioned on the outer surface of the weather resistive barrier.

According to certain embodiments of the invention, for instance, the meltblown layer may comprise an average shot height, rope height, or both (i.e. extending in the Z-direction) from about 0.1 mm to about 1.0 mm. In some embodiments of the invention, for example, the meltblown layer may comprise an average shot height, rope height, or both from about 0.25 mm to about 0.75 mm. In other embodiments of the invention, for instance, the meltblown layer may comprise an average shot height, rope height, or both from about 0.4 mm to about 0.6 mm. In further embodiments of the invention, for example, the meltblown layer may comprise an average shot height, rope height, or both of about 0.5 mm. As such, in certain embodiments of the invention, the meltblown layer may comprise an average shot height, rope height, or both from at least about any of the following: 0.1, 0.15, 0.2, 0.25, 0.3, 0.35, 0.4, 0.45, and 0.5 mm and/or at most about 1.0, 0.95, 0.9, 0.85, 0.8, 0.75, 0.7, 0.65, 0.6, 0.55, and 0.5 mm (e.g., about 0.35-0.9 mm, about 0.15-0.8 mm, etc.).

According to certain embodiments of the invention, for instance, the meltblown layer may comprise a basis weight from about 1 gsm to about 20 gsm. In some embodiments of the invention, for example, the meltblown layer may comprise a basis weight from about 2 gsm to about 15 gsm. In other embodiments of the invention, for instance, the meltblown layer may comprise a basis weight from about 3 gsm to about 10 gsm. In certain embodiments of the invention, for example, the meltblown layer may comprise a basis weight from about 4 gsm to about 6 gsm. In further embodiments of the invention, for instance, the meltblown layer may comprise a basis weight of about 5 gsm. As such, in certain embodiments of the invention, the meltblown layer may comprise a basis weight from at least about any of the following: 1, 2, 3, 4, and 5 gsm and/or at most about 20, 19, 18, 17, 16, 15, 14, 13, 12, 11, 10, 9, 8, 7, 6, and 5 gsm (e.g., about 2-12 gsm, about 4-18 gsm, etc.).

In accordance with certain embodiments of the invention, for example, the weather resistive barrier may comprise a film laminated to a fibrous material, while in other embodiments of the invention the weather resistive barrier does not include a film (e.g., devoid of a film). In some embodiments of the invention, for instance, the fibrous material may comprise a woven material. In further embodiments of the invention, for example, the woven material may comprise a polypropylene or a polyethylene (or other polymeric material) woven material. In other embodiments of the invention, for instance, the fibrous material may comprise a nonwoven material. In such embodiments of the invention, for example, the nonwoven material may comprise a polypropylene or a polyethylene (or other polymeric material) nonwoven material. According to certain embodiments of the invention, for instance, the nonwoven material may comprise, for example, a spunbond layer. In other embodiments of the invention, for example, the nonwoven material may comprise a meltblown layer. Although the weather resistive barrier may comprise a fibrous material as described herein, the weather resistive material may be any suitable material as understood by one of ordinary skill in the art including, but not limited to, at least one of paper, tar paper, felt, roofing felt, a thermoplastic material, a synthetic resin, an olefin resin, a polyolefin polymer, polypropylene (as already discussed), a high density polyethylene, a polystyrene, a nylon, a polyvinyl chloride (PVC) and/or the like. In some embodiments of the invention, for instance, the weather resistive barrier may comprise from greater than 60% (e.g., about 60% to about 99%) by weight of a polypropylene.

According to certain embodiments of the invention, for example, weather resistive barriers that include a film may comprise a breathable polyolefin film. The breathable polyolefin film, for instance, may comprise a microporous film or a monolithic film. In further embodiments of the invention, for example, the film may comprise less than 40% (e.g., from about 1% to about 40%) by weight of the weather resistive barrier. Moreover, according to certain embodiments of the invention, for example, the breathable polyolefin film may further comprise calcium carbonate (i.e. a filler). As noted above, certain embodiments of the invention include a weather resistive barrier that may be devoid of any film layer, such as Tyvek® which utilizes fine high-density polyethylene (HDPE) spun fibers that are fused together to form a uniform web having numerous extremely small pores that resist bulk water and air penetration, while allowing moisture vapor to pass.

According to certain embodiments of the invention, for instance, at least one of the fibrous material and/or the film of the weather resistive barrier may further comprise a UV stabilizer additive. In such embodiments of the invention, for example, the weather resistive barrier may comprise from about 0.1% to about 3% by weight of the UV stabilizer additive.

In some embodiments of the invention, for instance, the weather resistive barrier may further comprise a pigment, said pigment may comprise, by way of example only, carbon black and titanium dioxide. For instance, the pigment may be selected to provide any final color of choice (e.g., blue, green, etc.). In such embodiments of the invention, for example, the weather resistive barrier may comprise less than 2% (e.g., from about 0.1% to about 2%) by weight of the pigment. In some embodiments of the invention, for instance, the pigment may comprise less than 10% (e.g., from about 0.1% to about 10%) by weight of carbon black and less than 1% (e.g., from about 0.1% to about 1%) by weight of titanium dioxide.

According to certain embodiments of the invention, for instance, the weather resistive barrier may comprise a basis weight from about 5 gsm to about 250 gsm (e.g., 50 gsm to about 150 gsm). In other embodiments of the invention, for example, the weather resistive barrier may comprise a basis weight from about 75 gsm to about 100 gsm. In further embodiments of the invention, for instance, the weather resistive barrier may comprise a basis weight from about 94 gsm to about 95 gsm. In certain embodiments of the invention, for example, the weather resistive barrier may comprise a basis weight of 94.94 gsm. As such, in certain embodiments of the invention, the weather resistive barrier may comprise a basis weight from at least about any of the following: 5, 10, 20, 30, 40, 50, 55, 60, 65, 70, 75, 80, 85, 90, 91, 92, 93, and 94 gsm and/or at most about 250, 225, 200, 175, 150, 140, 130, 120, 110, 100, 99, 98, 97, 96, and 95 gsm (e.g., about 60-96 gsm, about 90-100 gsm, etc.). Basis weight was measured in a way that is consistent with the ASTM test method D-3776.

According to certain embodiments of the invention, for example, the weather resistive barrier may comprise a thickness from about 1 mil to about 50 mils (e.g., about 5 mils to about 20 mils). In some embodiments of the invention, for instance, the weather resistive barrier may comprise a thickness from about 10 mils to about 15 mils. In further embodiments of the invention, for example, the weather resistive barrier may comprise a thickness from about 12 mils to about 13 mils. As such, in certain embodiments of the invention, the weather resistive barrier may comprise a thickness from at least about any of the following: 1, 2, 3, 4, 5, 6, 7, 8, 9, 10, 11, and 12 mils and/or at most about 50, 40, 30, 20, 19, 18, 17, 16, 15, 14, and 13 mils (e.g., 7-14 mils, about 10-19 mils, about 3-40 mils, etc.). Thickness was measured in a way that is consistent with the ASTM test method D-1777.

According to certain embodiments of the invention, for instance, the weather resistive barrier may comprise a bursting strength from about 20 psi to about 200 psi (e.g., about 50 psi to about 100 psi). In some embodiments of the invention, for example, the weather resistive barrier may comprise a bursting strength from about 55 psi to about 75 psi. In further embodiments of the invention, for instance, the weather resistive barrier may comprise a bursting strength from about 60 psi to about 70 psi. In other embodiments of the invention, for example, the weather resistive barrier may comprise a bursting strength of about 66 psi. As such, in certain embodiments of the invention, the weather resistive barrier may comprise a bursting strength from at least about any of the following: 20, 25, 30, 40, 50, 51, 52, 53, 54, 55, 56, 57, 58, 59, 60, 61, 62, 63, 64, 65, and 66 psi and/or at most about 200, 175, 150, 125, 100, 95, 90, 85, 80, 75, 70, 69, 68, 67, and 66 psi (e.g., about 56-80 psi, about 62-100 psi, etc.). Bursting strength was measured in a way that is consistent with the ASTM test method D-3786.

According to certain embodiments of the invention, for example, the weather resistive barrier may comprise a dry tensile strength of 80/87 (i.e. 80 lbs md, 87 lbs xd) as tested by ASTM D-5034. In certain embodiments of the invention, for instance, the weather resistive barrier may comprise a trapezoidal tear strength of about 30/33 (i.e. 30 lbs md, 33 lbs xd) as tested by ASTM D-5733-9.

According to certain embodiments of the invention, for example, the weather resistive barrier may comprise a hydrostatic pressure resistance from about 500 cm to about 2000 cm (e.g., 800 cm to about 1000 cm). In other embodiments of the invention, for instance, the weather resistive barrier may comprise a hydrostatic pressure resistance from about 825 cm to about 900 cm. In further embodiments of the invention, for example, the weather resistive barrier may comprise a hydrostatic pressure resistance from about 850 cm to about 875 cm. In certain embodiments of the invention, for instance, the weather resistive barrier may comprise a hydrostatic pressure resistance from about 860 cm to about 870 cm. In some embodiments of the invention, for example, the weather resistive barrier may comprise a hydrostatic pressure resistance of about 865 cm. As such, in certain embodiments of the invention, the weather resistive barrier may comprise a hydrostatic pressure resistive from at least about any of the following: 250, 500, 600, 700, 800, 805, 810, 815, 820, 825, 830, 835, 840, 845, 850, 855, 860, and 865 cm and/or at most about 2000, 1750, 1500, 1250, 1000, 975, 950, 925, 900, 895, 890, 885, 880, 875, 870, and 865 cm (e.g., about 815-900 cm, about 830-875 cm, about 250-1750 cm, etc.). Hydrostatic pressure resistance was measured in a way that is consistent with the AATCC 127-1995 test method.

Moreover, according to certain embodiments of the invention, for instance, the weather resistive barrier may comprise a Gurley Hill Porosity from about 2500 s/100 cc to about 5000 s/100 cc. Gurley Hill Porosity was measured in a way that is consistent with the TAPPI T-460 test method.

In accordance with certain embodiments of the invention, for example, the weather resistive barrier may comprise a moisture vapor transmission rate (MVTR) from about 1 US perms to about 75 US perms (e.g., about 5 US perms to about 30 US perms). In some embodiments of the invention, for instance, the weather resistive barrier may comprise an MVTR from about 7 US perms to about 20 US perms. In other embodiments of the invention, for example, the weather resistive barrier may comprise an MVTR from about 10 US perms to about 15 US perms. In further embodiments of the invention, for instance, the weather resistive barrier may comprise an MVTR from about 11 US perms to about 12 US perms. As such, in certain embodiments of the invention, the weather resistive barrier may comprise an MVTR from at least about any of the following: 1, 3, 5, 6, 7, 8, 9, 10, 11, 12, 15, and 20 US perms and/or at most about 75, 70, 60, 50, 40, 30, 25, 20, 19, 18, 17, 16, 15, 14, 13, and 12 US perms (e.g., about 7-19 US perms, about 10-30 US perms, etc.). MVTR was measured in a way that is consistent with the ASTM test method E-96-95 procedure A.

According to certain embodiments of the invention, for example, the weather resistive barrier may comprise an UV light exposure resistance from about 4 months to about 12 months. In some embodiments of the invention, for instance, the weather resistive barrier may comprise a UV light exposure resistance from about 5 months to about 7 months. In other embodiments of the invention, for example, the weather resistive barrier may comprise a UV light exposure resistance of about 6 months. As such, in certain embodiments of the invention, the weather resistive barrier may comprise a UV light exposure resistance from at least about any of the following: 4, 5, and 6 months and/or at most about 12, 11, 10, 9, 8, 7, and 6 months (e.g., about 4-10 months, about 6-12 months, etc.).

In certain embodiments of the invention, for instance, the weather resistive barrier may comprise an air leakage from about 0.001 L(S·M$^2$) to 0.01 L(S·M$^2$) at 75 pascals (e.g., about 0.001 L(S·M$^2$) to 0.005 L(S·M$^2$) at 75 pascals). In some embodiments of the invention, for example, the weather resistive barrier may comprise an air leakage from about 0.002 L(S·M$^2$) to 0.004 L(S·M$^2$) at 75 pascals. In further embodiments of the invention, for instance, the weather resistive barrier may comprise an air leakage from about 0.0025 L(S·M$^2$) to 0.0035 L(S·M$^2$) at 75 pascals. As such, in certain embodiments of the invention, the weather resistive barrier may comprise an air leakage at 75 pascals from at least about any of the following: 0.001, 0.0015, 0.002, 0.0025, 0.003, and 0.0035 L(S·M$^2$) and/or at most about 0.01, 0.0075, 0.005, 0.0045, 0.004, and 0.0035 L(S·M$^2$) (e.g., about 0.002-0.0045 L(S·M$^2$), about 0.001-0.004 L(S·M$^2$), etc.).

EXAMPLES

The present disclosure is further illustrated by the following examples, which in no way should be construed as being limiting. That is, the specific features described in the following examples are merely illustrative and not limiting.

Test Method

Drainage efficiency of the following examples was measured in a way consistent with the ASTM test method E-2273. In particular, a clear acrylic plastic spray box measuring 24½" by 9½" by 7¼" was mounted on top of a test buck. The spray box was mounted to ensure that all water was directed into the opening at the top of the panel. The spray box contained two spray nozzles. The nozzles were mounted ½" from the front edge of the spray box and 5" to the right and to the left of the center. A drain basin was located below the test specimen which collected the water draining from the wall assembly and directed it into a container with a known weight. The specimen was sprayed for the duration of 75 minutes. The water draining from the wall assembly was collected and weighed at each 15-minute interval during testing. The water spray was terminated after 75 minutes. The specimen was allowed to drain for an additional 60 minutes and the collected water was weighed.

Base Wall Construction

The wall was constructed of nominal 2×4 Spruce-Pine-Fir wood. Four studs were spaced 16" on center with a top and bottom 2×4 wooden plate. The studs were sheathed with 17/32" thick plywood and secured to the studs with 8×1⅝" long drywall screws located at each stud location and spaced 18" on center.

Drainage Promoting Fabric

The drainage promoting fabric used in the following examples was formed using a TYPAR® housewrap weather resistive barrier and a meltblown layer having meltblown ropes and meltblown shot deposited on an outer surface of the weather resistive barrier. The drainage promoting fabric was produced at a melt temperature of 250° C. on a machine producing 60 yards per minute. The pump speed was set at 15 rpm, a DCD of 10 inches, an airflow of 11 m/s, and an air temperature of 290° C.

Installation

The wall was covered with the drainage promoting fabric and secured to the base wall with 1½" long 4d cap nails at each stud location and spaced 18" on center. The drainage promoting fabric was lapped 4" at the horizontal midspan and had a 6" overlap at the vertical midspan. The lap was sealed with a 4" self-adhered TYPAR® flashing AT. A sheet of 1" thick polystyrene was utilized over the housewrap and secured with 2" long 6d cap nails at each stud location and spaced 18" on center. A layer of polymer and cement base was applied over the polystyrene and then reinforced with glass fiber. An exterior layer of polymer and cement finish coat was applied.

Example 1

In Example 1, the drainage promoting fabric described above was tested in a vertical orientation according to the test method previously described herein. Tables 1 and 2 illustrate the results as follows:

TABLE 1

Drainage Promoting Fabric: Vertical Orientation

| | Water Applied (minutes) | | | | | Drain Time (minutes) |
|---|---|---|---|---|---|---|
| Test Wall #1 | 15 | 30 | 45 | 60 | 75 | 60 |
| Total Weight (lbs) | 4.046 | 3.972 | 4.338 | 3.626 | 4.090 | 2.992 |
| Tare Weight (lbs) | 0.708 | 0.754 | 0.708 | 0.754 | 0.708 | 0.754 |
| Net Weight (lbs) | 3.338 | 3.218 | 3.630 | 2.872 | 3.382 | 2.238 |

TABLE 2

| | |
|---|---|
| Total Water Applied (lbs) | 18.950 |
| Total Water Drained (lbs) | 18.678 |
| % Water Drained | 98.5% |
| % Water Retained | 1.5% |

Example 2

In Example 2, the drainage promoting fabric described above was tested in a horizontal orientation according to the test method previously described herein. Tables 3 and 4 illustrate the results as follows:

TABLE 3

Drainage Promoting Fabric: Horizontal Orientation

| | Water Applied (minutes) | | | | | Drain Time (minutes) |
|---|---|---|---|---|---|---|
| Test Wall #2 | 15 | 30 | 45 | 60 | 75 | 60 |
| Total Weight (lbs) | 3.022 | 4.118 | 3.874 | 4.214 | 4.030 | 1.874 |
| Tare Weight (lbs) | 0.708 | 0.754 | 0.708 | 0.754 | 0.708 | 0.754 |
| Net Weight (lbs) | 2.314 | 3.364 | 3.166 | 3.460 | 3.322 | 1.120 |

TABLE 4

| | |
|---|---|
| Total Water Applied (lbs) | 17.860 |
| Total Water Drained (lbs) | 16.746 |
| % Water Drained | 93.8% |
| % Water Retained | 6.2% |

Example 3

In Example 3, the drainage promoting fabric described above was again tested in a vertical orientation according to the test method previously described herein. Tables 5 and 6 illustrate the results as follows:

TABLE 5

Drainage Promoting Fabric: Vertical Orientation

| | Water Applied (minutes) | | | | | Drain Time (minutes) |
|---|---|---|---|---|---|---|
| Test Wall #3 | 15 | 30 | 45 | 60 | 75 | 60 |
| Total Weight (lbs) | 3.396 | 3.818 | 4.204 | 3.766 | 3.816 | 2.816 |
| Tare Weight (lbs) | 0.708 | 0.754 | 0.708 | 0.754 | 0.708 | 0.754 |
| Net Weight (lbs) | 2.688 | 3.110 | 3.496 | 3.012 | 3.108 | 2.062 |

TABLE 6

| | |
|---|---|
| Total Water Applied (lbs) | 18.94 |
| Total Water Drained (lbs) | 17.47 |
| % Water Drained | 92.2% |
| % Water Retained | 7.8% |

Summary of Examples 1-3

TABLE 7

| Test Specimen | Drainage Efficiency |
|---|---|
| #1 | 98.5% |
| #2 | 93.8% |
| #3 | 92.2% |
| Average | 94.8% |

As such, drainage promoting fabric according to the invention may have an average drainage efficiency of about 95% as measured by the ASTM test method D-2273 when the water spray was applied directly to the innermost layer of TYPAR®. Moreover, no water was observed on the interior or exterior surface of any of the test specimens following testing.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

That which is claimed:

1. A drainage promoting fabric comprising:
   a weather resistive barrier having an outer surface; and
   a three-dimensional, non-uniform or non-continuous meltblown layer positioned on the outer surface of the weather resistive barrier, said meltblown layer comprising meltblown shot, meltblown ropes, or both; wherein the meltblown shot, the meltblown rope, or both is randomly and irregularly distributed on the outer surface of the weather resistive barrier.

2. The drainage promoting fabric according to claim 1, wherein the drainage promoting fabric comprises a drainage efficiency from about 90% to about 100%.

3. The drainage promoting fabric according to claim 1, wherein the drainage promoting fabric comprises a width from about 3 feet to about 10 feet.

4. The drainage promoting fabric according to claim 1, wherein the meltblown layer comprises at least one of a polypropylene, an ethylene-propylene impact copolymer blend, or any combination thereof.

5. The drainage promoting fabric according to claim 1, wherein the meltblown shot comprises irregularly shaped fibers, wads, or particles.

6. The drainage promoting fabric according to claim 1, wherein the meltblown layer comprises an average shot height, rope height, or both from about 0.1 mm to about 1.0 mm.

7. The drainage promoting fabric according to claim 1, wherein the meltblown layer comprises a basis weight from about 1 gsm to about 20 gsm.

8. The drainage promoting fabric according to claim 1, wherein the meltblown layer further comprises at least one of an anti-microbial additive, an anti-fungal additive, an ultraviolet (UV) stabilizer additive, or any combination thereof.

9. The drainage promoting fabric according to claim 1, wherein the weather resistive barrier comprises a film laminated to a fibrous material.

10. The drainage promoting fabric according to claim 9, wherein the fibrous material comprises a nonwoven material.

11. The drainage promoting fabric according to claim 1, wherein the weather resistive barrier comprises a thickness from about 5 mils to about 20 mils.

12. The drainage promoting fabric according to claim 1, wherein the weather resistive barrier comprises a moisture vapor transmission rate (MVTR) from about 5 US perms to about 30 US perms.

13. A building assembly
   comprising:
      an inner sheathing member;
      an exterior building material; and
      a drainage promoting fabric positioned between the inner sheathing member and the exterior building material,
   wherein the drainage promoting fabric comprises:
      a weather resistive barrier having an outer surface; and
      a three-dimensional, non-uniform or non-continuous meltblown layer positioned on the outer surface of the weather resistive barrier, said meltblown layer comprising meltblown shot, meltblown ropes, or both; wherein the meltblown shot, the meltblown rope, or both is randomly and irregularly distributed on the outer surface of the weather resistive barrier.

14. The building assembly according to claim 13, wherein the drainage promoting fabric comprises a drainage efficiency from about 90% to about 100%.

15. The building assembly according claim 13, wherein the meltblown shot comprises irregularly shaped fibers, wads, or particles, and wherein the meltblown layer comprises an average shot height, rope height, or both from about 0.1 mm to about 1.0 mm.

16. The building assembly according to claim 13, wherein the meltblown shot, the meltblown rope, or a combination thereof defines a continuous air gap between the weather resistive barrier and the exterior building material.

17. The building assembly according to claim 16, wherein the continuous air gap comprises a height corresponding to the average shot height, rope height, or both.

18. A process for forming a drainage promoting fabric, the process comprising:
   providing a weather resistive barrier having an outer surface;
   providing a three-dimensional, non-uniform or non-continuous meltblown layer, said meltblown layer comprising meltblown shot, meltblown ropes, or both; wherein the meltblown shot, the meltblown rope, or both is randomly and irregularly distributed on the outer surface of the weather resistive barrier; and
   attaching the meltblown layer to the weather resistive barrier.

19. The process according to claim 18, wherein attaching the meltblown layer to the weather resistive barrier comprises meltspinning the meltblown layer directly onto the weather resistive barrier.

\* \* \* \* \*